(12) United States Patent
Ikeda et al.

(10) Patent No.: US 11,823,715 B2
(45) Date of Patent: Nov. 21, 2023

(54) IMAGE PROCESSING DEVICE AND IMAGE PROCESSING METHOD

(71) Applicant: SONY GROUP CORPORATION, Tokyo (JP)

(72) Inventors: Hiroshi Ikeda, Tokyo (JP); Nobuho Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 130 days.

(21) Appl. No.: 17/437,235

(22) PCT Filed: Feb. 4, 2020

(86) PCT No.: PCT/JP2020/004031
§ 371 (c)(1),
(2) Date: Sep. 8, 2021

(87) PCT Pub. No.: WO2020/189058
PCT Pub. Date: Sep. 24, 2020

(65) Prior Publication Data
US 2022/0172746 A1 Jun. 2, 2022

(30) Foreign Application Priority Data
Mar. 20, 2019 (JP) ................................. 2019-052849

(51) Int. Cl.
*G11B 27/06* (2006.01)
*G06V 10/22* (2022.01)

(52) U.S. Cl.
CPC ............ *G11B 27/06* (2013.01); *G06V 10/235* (2022.01)

(58) Field of Classification Search
CPC .............................. G06V 10/235; G11B 27/06
See application file for complete search history.

(56) References Cited

U.S. PATENT DOCUMENTS

| | | | |
|---|---|---|---|
| 9,898,868 B2 * | 2/2018 | Aonuma | ............... G06T 19/006 |
| 2006/0115185 A1 | 6/2006 | Iida et al. | |

(Continued)

FOREIGN PATENT DOCUMENTS

| | | |
|---|---|---|
| CN | 101459773 A | 6/2009 |
| CN | 102611846 A | 7/2012 |

(Continued)

OTHER PUBLICATIONS

International Search Report and Written Opinion of PCT Application No. PCT/JP2020/004031, dated Apr. 14, 2020, 08 pages of ISRWO.

(Continued)

*Primary Examiner* — Sunghyoun Park
(74) *Attorney, Agent, or Firm* — CHIP LAW GROUP

(57) ABSTRACT

Cut-out processing for cutting out a portion of a region of a captured image, display control processing of a first screen including a captured image display region for displaying the captured image and a cut-out image display region for displaying a cut-out image cut out in the cut-out processing, display control processing for making display transition from the first screen to a second screen in which a cut-out region obtained from the captured image is set, processing for receiving a first user operation of designating, in the second screen, at least one set of coordinates and a second user operation of designating a subject, and processing for setting a cut-out region on the basis of the first user operation or the second user operation are performed.

17 Claims, 31 Drawing Sheets

(56) References Cited

U.S. PATENT DOCUMENTS

| | | | |
|---|---|---|---|
| 2009/0153649 A1* | 6/2009 | Hirooka | G03B 13/32 348/240.99 |
| 2010/0321536 A1 | 12/2010 | Lee | |
| 2011/0102829 A1 | 5/2011 | Jourdan | |
| 2013/0125039 A1 | 5/2013 | Murata | |
| 2014/0016823 A1* | 1/2014 | Ye | G06T 19/20 382/103 |
| 2014/0092290 A1 | 4/2014 | Hirooka et al. | |
| 2016/0295120 A1 | 10/2016 | Ota et al. | |
| 2017/0150066 A1 | 5/2017 | Hirooka et al. | |
| 2018/0101723 A1* | 4/2018 | Wakako | G06V 20/40 |
| 2018/0108144 A1 | 4/2018 | Tsunashima | |
| 2019/0124268 A1 | 4/2019 | Ota et al. | |
| 2019/0373182 A1 | 12/2019 | Hirooka et al. | |
| 2020/0162681 A1 | 5/2020 | Hirooka et al. | |

FOREIGN PATENT DOCUMENTS

| | | |
|---|---|---|
| CN | 103973973 A | 8/2014 |
| CN | 103973974 A | 8/2014 |
| CN | 106060377 A | 10/2016 |
| CN | 107431762 A | 12/2017 |
| CN | 110012228 A | 7/2019 |
| DE | 102016105879 A1 | 10/2016 |
| EP | 3285477 A1 | 2/2018 |
| GB | 2539308 A | 12/2016 |
| GB | 2569429 A | 6/2019 |
| GB | 2572718 A | 10/2019 |
| JP | 2005-175684 A | 6/2005 |
| JP | 2008-072702 A | 3/2008 |
| JP | 2008-160550 A | 7/2008 |
| JP | 4959535 B2 | 6/2012 |
| JP | 2013-247508 A | 12/2013 |
| JP | 2016-197818 A | 11/2016 |
| JP | 6724904 B2 | 7/2020 |
| KR | 10-2016-0118969 A | 10/2016 |
| KR | 10-2018-0098491 A | 9/2018 |
| WO | 2016/167017 A1 | 10/2016 |

OTHER PUBLICATIONS

Extended European Search Report of EP Application No. 20774686.8, dated Mar. 16, 2022, 08 pages.

* cited by examiner

EW1 DESIGNATION

EW2 DESIGNATION

EW3 DESIGNATION

EW4 DESIGNATION

EW5 DESIGNATION

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/004031 filed on Feb. 4, 2020, which claims priority benefit of Japanese Patent Application No. JP 2019-052849 filed in the Japan Patent Office on Mar. 20, 2019. Each of the above-referenced applications is hereby incorporated herein by reference in its entirety.

TECHNICAL FIELD

The present technology relates to an image processing device, an image processing method, and a program, and more particularly, to a technical field regarding cutting out from an image and switching including to a cut-out image.

BACKGROUND ART

In image content created for broadcasting, distribution, or the like, captured images (shots) obtained by one or a plurality of cameras are often switched between in accordance with contents of a scene which is imaged. Thereby, it is possible to produce realistic and interesting image content.

In particular, an image obtained by cutting out a portion of a range from a captured image may also be generated, and this cut-out image can also be used as one shot. PTL 1 below discloses a tracking camera technique that allows an operator to set in advance the composition and an angle of view including a subject to be tracked, and to change the composition and the angle of view including the subject during tracking.

CITATION LIST

Patent Literature

[PTL 1]
JP 2013-247508 A

SUMMARY

Technical Problem

In recent years, platforms for image distribution of such as moving images have expanded, which has resulted in an increase in the demand for image production and image distribution. In particular, even when the number of staff members is small or a person has no specialized knowledge, it is desirable to be able to, for example, produce and distribute live videos.

However, it is a relatively difficult task to cut out a portion including a specific subject from a captured image and switch between a plurality of shots including the cut-out image to form a moving image for broadcasting or distribution.

Consequently, the present disclosure proposes a technique for enabling cutting-out according to a user's intention while facilitating an operation of cutting out a portion of a range from a captured image.

Solution to Problem

An image processing device according to the present technology includes a cut-out processing unit configured to cut out a portion of a region of a captured image, and a user interface control unit configured to perform display control processing for a first screen including a captured image display region for displaying the captured image and a cut-out image display region for displaying a cut-out image cut out by the cut-out processing unit, display control processing for making a display transition from the first screen to a second screen in which a cut-out region obtained from the captured image is set, processing for receiving a first user operation of designating, in the second screen, at least one set of coordinates and a second user operation of designating a subject, and processing for setting a cut-out region on the basis of the first user operation or the second user operation.

It is assumed that images are switched between by switching processing at the time of, for example, real-time broadcasting, distribution, recording, transfer, or the like of image content having a length in a time axis direction as a moving image, a still image slide show, or the like. In this case, in addition to the captured image itself, an image (crop image) which is cut out from a captured image can also be used. In the present technology, a user can perform the setting of such a cut-out image. In this case, the first screen displays the captured image and the cut-out image. In the second screen, a user interface capable of designating a cut-out region is provided.

In the above-described image processing device according to the present technology, it is conceivable that the user interface control unit perform control for displaying an image being a cut-out source in the second screen and control for displaying a cut-out region designated by the first user operation in accordance with the first user operation on the image being the cut-out source.

Since the image being the cut-out source is displayed, a user can thus perform an operation of designating a cut-out frame on the image.

Displaying the cut-out region (also referred to as "the display of the cut-out region") indicates that display showing a range as the cut-out region is executed, and is display allowing visual recognition of the cut-out region such as displaying a frame indicating the cut-out region, highlighting the cut-out region, or displaying the cut-out region in a different color.

In the above-described image processing device according to the present technology, it is conceivable that the user interface control unit perform control for displaying the cut-out region in different modes in a case where the cut-out region based on the first user operation does not satisfy a resolution condition of the cut-out image and a case where the first user operation satisfies the resolution condition of the cut-out image.

A display mode of the display of the cut-out region is changed according to whether or not the cut-out region satisfies the resolution condition of the cut-out image when the display of the cut-out region is performed in response to a manual operation on the image being the cut-out source.

In the above-described image processing device according to the present technology, it is conceivable that the displays in different display modes of the display of the cut-out region when the cut-out region does not satisfy the resolution condition and the display of the cut-out region when the cut-out region satisfies the resolution condition be displays corresponding to at least one of a display mode in which the color or brightness of the display of the cut-out region is different, a display mode in which the type of display of the cut-out region is different, and a display mode in which an additional image is different.

The color or brightness of the display of the cut-out region is the color or brightness of a frame line or a region for the display of the cut-out region.

The type of display of the cut-out region is, for example, types including a bold line or a thin line for frame lines of a cut-out region image, or types including a solid line, a dashed line, a dotted line, an alternating dotted-dashed line, an alternating two dots-dashed line, or the like. In addition, there are image types such as having shadows, hatching, monochrome/color, and pointillism for a region for the display of the cut-out region.

The additional image is text, an icon, a sign, or the like, and the display mode having a different additional image is the display of text contents, an icon, or the like indicating whether or not a resolution condition is satisfied, display only in a case where the resolution condition is satisfied, display in a case where the resolution condition is not satisfied, or the like.

In the above-described image processing device according to the present technology, it is conceivable that the user interface control unit perform control for displaying the image being the cut-out source in the second screen and set a cut-out region including a subject designated by the second user operation in accordance with the second user operation on the image being the cut-out source.

Since the image being the cut-out source is displayed, a user can thus perform an operation of selecting and designating a subject on the image.

In the above-described image processing device according to the present technology, it is conceivable that the user interface control unit perform control for displaying a cut-out region indicating the cut-out region including the subject designated by the second user operation in accordance with the second user operation.

For example, a cut-out frame or the like including the subject selected by the user on the image being the cut-out source may be displayed.

Also in this case, the display of the cut-out region indicates display showing the cut-out region, and is display allowing visual recognition of the cut-out region such as displaying a frame indicating the cut-out region, highlighting the cut-out region, or displaying the cut-out region in a different color.

In the above-described image processing device according to the present technology, it is conceivable that the user interface control unit calculate a cut-out region in accordance with a selection state of composition information when the cut-out region including the subject designated by the second user operation is set.

The composition information is the state of zoom-in/zoom-out, is information indicating whether to perform spacing (spacing processing) or not, is information regarding the type of composition, or the like. The type of composition is a type such as an up shot, a bust shot, a waist shot, a knee shot, or a full-length shot, and indicates a type such as a sun-flag composition or the rule of thirds.

In the above-described image processing device according to the present technology, it is conceivable that the user interface control unit performs control for displaying information regarding a composition with respect to the subject in the second screen.

The information regarding a composition is, for example, composition information, information regarding the setting of a crop region based on the composition information, or the like. The information regarding a composition includes, for example, display indicating the direction of spacing in a case where spacing is performed according to the orientation of a face as a composition, and the like. Naturally, the information regarding a composition also includes information of zoom-in/zoom-out, information of the degree of zoom-in/zoom-out, information regarding whether or not to perform spacing, or the like, information of the types of various compositions, and the like.

In the above-described image processing device according to the present technology, it is conceivable that the user interface control unit perform control for displaying a candidate frame indicating a cut-out candidate for each subject who is a candidate for a cut-out image in the second screen, and receive an operation of designating the candidate frame as the second user operation.

A candidate frame is displayed in response to the subject which is a candidate for the cut-out image in the second screen, and a cut-out region is set in a semi-automatic manner by an operation for the candidate frame.

In the above-described image processing device according to the present technology, it is conceivable that the user interface control unit perform control for separately displaying the candidate frames for each composition and receive the designation of a composition by a designation operation for the separation of the candidate frames. For example, the candidate frames are divisively displayed according to an up shot, a bust shot, a waist shot, a knee shot, and a full-length shot, and composition designation is also performed according to a designated position as a second operation.

In the above-described image processing device according to the present technology, it is conceivable that the user interface control unit performs control for displaying, in the second screen, a captured image which is not a target for cut-out region setting but may be a cut-out source, together with an image which is a cut-out source being a target for cut-out region setting.

For example, not only may a captured image on which cut-out region setting is currently being performed be displayed in a large size, but also another captured image which is a cut-out source may be displayed.

In the above-described image processing device according to the present technology, it is conceivable that the user interface control unit controls display allowing an automatic setting mode of a cut-out region to be selected in the second screen and receives an automatic setting mode operation.

In a case where cut-out region setting based on a first operation (manual operation) and cut-out region setting in a semi-automatic mode based on a second operation are being performed in the second screen, an instruction for automatic setting can also be given.

In the above-described image processing device according to the present technology, it is conceivable that the image processing device further includes a switching control unit configured to switch a main image to an image selected from among a plurality of images including the captured image and the cut-out image, and the user interface control unit performs control for displaying, in the first screen, a main image and an image to be a next main image in different display modes.

The main image is an image which is used for a certain period of time on a time axis by switching processing for real-time broadcasting, distribution, recording, transfer, or the like of image content having a length in a time axis direction as a moving image, a still image slide show, or the like. The image is an image which is used as moving image content output for broadcasting or the like by, for example, switching processing.

Further, for example, in a case where real-time broadcasting or the like is performed by imaging an event by a plurality of cameras, images captured by the cameras are a plurality of images, and a captured image obtained by a certain camera and output in the broadcasting or the like at present among the images is a main image mentioned here.

Further, in a case where real-time broadcasting is performed by imaging an event by one camera, an image which is a cut-out image obtained by cutting out a portion from an image captured by the camera and is output in the broadcasting or the like at present is also a main image mentioned here.

In the above-described image processing device according to the present technology, it is conceivable that the user interface control unit controls display indicating, on a cut-out image to be displayed in the first screen, whether cut-out region setting has been performed by the first user operation or cut-out region setting has been performed by the second user operation.

That is, regarding the cut-out image, in which mode cut-out region setting has been performed can be confirmed on the first screen.

In the above-described image processing device according to the present technology, it is conceivable that the user interface control unit controls display indicating, on a cut-out image to be displayed in the first screen, that an automatic setting mode has been selected and cut-out region setting has been performed.

That is, in a case where cut-out region setting is performed on the cut-out image in an automatic setting mode, it is possible to confirm that the cut-out region setting has been performed on the first screen.

In the above-described image processing device according to the present technology, it is conceivable that the switching control unit automatically performs switching of a main image in accordance with switching timing determination by an automatic switching mode being set.

The switching of the main image is also executed, for example, not only by manual processing but also by automatic switching processing.

In the above-described image processing device according to the present technology, it is conceivable that selection processing for an image to be a next main image is performed in accordance with the switching of the main image being performed by the switching control unit, and the user interface control unit controls, in the first screen, the display of the image being the main image by switching the image to be the next main image by the selection processing.

That is, an image being a main image is selected at the next switching timing in accordance with the switching of the main image, and the display of the main image and the next main image is updated in the first screen.

In the above-described image processing device according to the present technology, it is conceivable that, in the selection processing, selection processing for making the degree of priority of selection of a cut-out image having been subjected to cut-out region setting in the second screen higher than those of other images is performed. For example, an image on which an operation related to a cut-out region has been performed in the second screen is easily selected as a main screen next.

An image processing method according to the present technology is an image processing method performed by an image processing device and including cut-out processing for cutting out a portion of a region of a captured image, display control processing of a first screen including a captured image display region for displaying the captured image and a cut-out image display region for displaying a cut-out image cut out in the cut-out processing, display control processing for making display transition from the first screen to a second screen in which a cut-out region obtained from the captured image is set, processing for receiving a first user operation of designating, in the second screen, at least one set of coordinates and a second user operation of designating a subject, and processing for setting a cut-out region on the basis of the first user operation or the second user operation.

That is, the captured image and the cut-out image can be confirmed in the first screen, and an operation related to the setting of a cut-out region can be performed in the second screen.

A program according to the present technology is a program that causes an information processing device to execute processing of the image processing method. The technology of the present disclosure can be executed by an information processing device and a processor in, for example, an imaging device, a switcher device, a general-purpose terminal device, or the like.

DESCRIPTION OF EMBODIMENTS

Hereinafter, an embodiment will be described in the following order.

<1. Configuration of device applicable as image processing device>
<2. Example of functional configuration of image processing device>
<3. Multi-view screen>
<4. Crop setting screen>
<5. Crop setting processing>
<6. Switching processing>
<7. Summary and modification example>

Meanwhile, terms used in the description of the embodiment will be described.

A "captured image" indicates an image captured by an imaging device.

A "cut-out image" (or a "crop image") is an image which is cut out from a captured image. An image obtained by cutting out a portion of a region of a captured image is still an image captured by an imaging device, but an image which is cut out from a "captured image" will be referred to as a "cut-out image" (or a "crop image") for the sake of distinguishment in description.

Strictly speaking, it can also be said that an image normally output from an imaging device is, for example, an image obtained by cutting out only a valid pixel region or is an image obtained by cutting out a portion for camera shake correction or the like, but these images are assumed to be "captured images". It is assumed that an image output as an image of an entire subject imaged from one imaging device is just a "captured image", and an image which is cut out from the "captured image" and set as an image of an independent system is a "cut-out image" (or a "crop image").

Meanwhile, a portion of a "cut-out image" may further be cut out, thereby generating a "cut-out image".

A "cut-out region" (or a "crop region") is a region in which a cut-out image (crop image) is cut out from a captured image.

A "cut-out frame" (or a "crop frame") is a frame that indicates a cut-out region on display and is a mode of display of cut-out region which is performed on a display screen.

A "shot" indicates an image which is input for switching, and thus is a term including both a "captured image" and a "cut-out region" (or a "crop region"). A "main image" is an image (shot) which is used for a certain period of time on a time axis by switching processing for real-time broadcasting, distribution, recording, transfer, or the like of image content having a length in a time axis direction as a moving image, a still image slide show, or the like. That is, the main image is a shot which is selected in the switching processing so as to be used as moving image content output for broadcasting or the like. Any one of a plurality of shots is sequentially selected as a main image.

1. Configuration of Device Applicable as Image Processing Device

An image processing device according to an embodiment of the present disclosure includes a user interface for performing image cutting-out (cropping) for cutting out a portion of a captured image, and thus such an image processing device can be realized in various devices. First, a device to which the technology of the present disclosure can be applied will be described.

Figure 1:
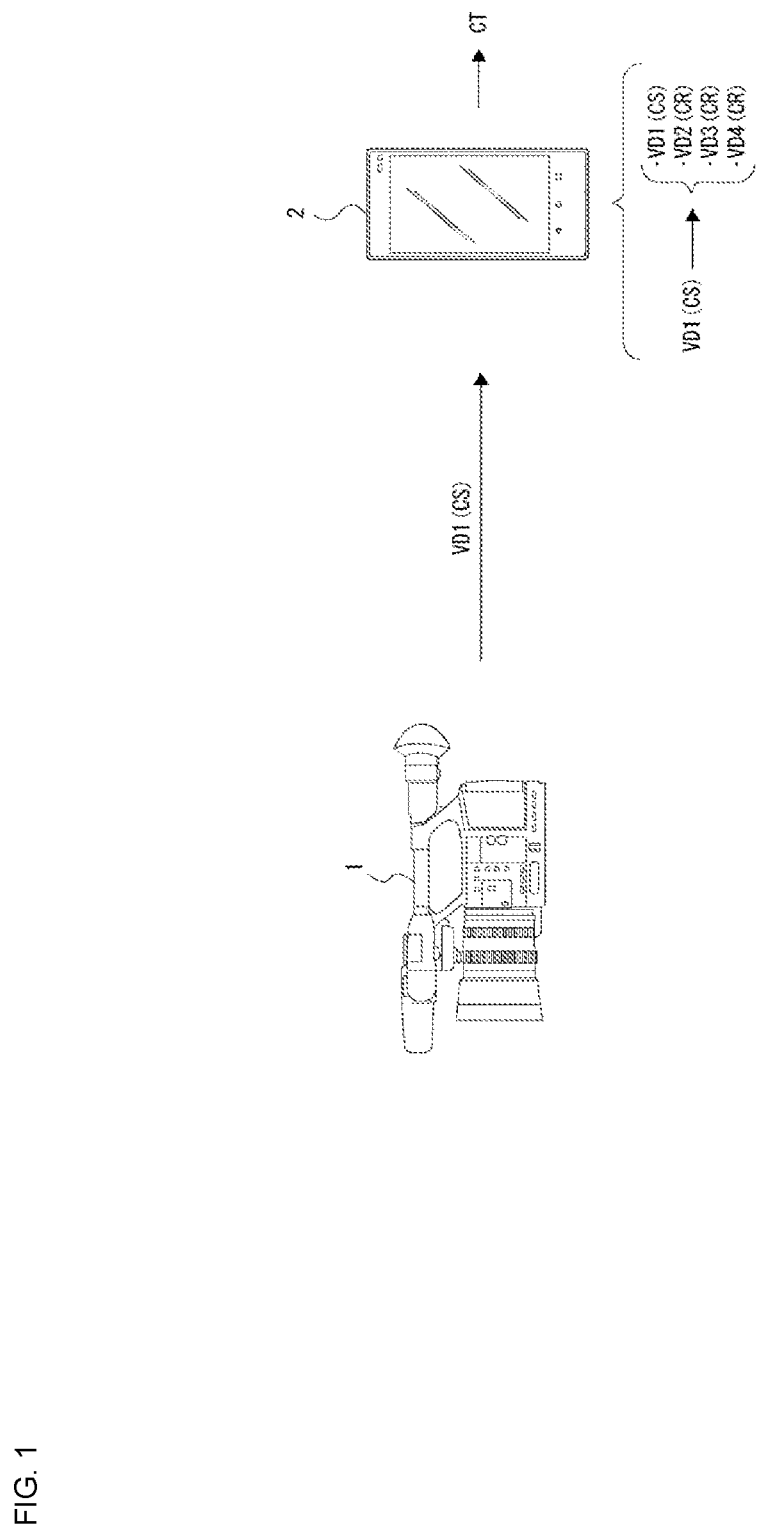
FIG. 1 is a diagram illustrating a configuration example of a device for realizing operations in an embodiment.

FIG. 1 is an example in which a portable terminal 2 has a function as the image processing device of the present technology. The portable terminal 2 is a device such as a smartphone or a tablet device.

A shot VD1 as a captured moving image is transmitted to the portable terminal 2 from one imaging device 1.

Communication between the imaging device 1 and the portable terminal 2 is performed by, for example, wired communication or wireless communication (for example, short-distance wireless communication or the like).

The portable terminal 2 performs cropping processing (cut-out processing) on the shot VD1 supplied from the imaging device 1 to generate shots VD2, VD3, and VD4. In addition, the portable terminal 2 can set the shots VD1, VD2, VD3, and VD4 as selectable images and sequentially select the images as main images by switching processing to generate moving image content CT, and can perform transmission output, display output, recording, uploading, and the like.

Meanwhile, hereinafter, the term "shot VD" is used in a case where a plurality of shots are collectively referred to as a shot without distinction, in a case where a certain shot which is not particularly limited is indicated, or the like.

Further, in FIG. 1, "(CS)" is added to the shot VD1 as a subscript, which indicates a captured image of the entire angle of view. That is, it is not a "crop image" as defined above, but a "captured image".

On the other hand, "(CR)" is added to the shots VD2, VD3, and VD4 as a subscript, which indicates an image which is cut out (cropped) from a captured image. Meanwhile, the subscripts "(CS)" and "(CR)" are similarly added in FIGS. 2, 3, 4, 5, 12, 13, and 14.

Figure 2:
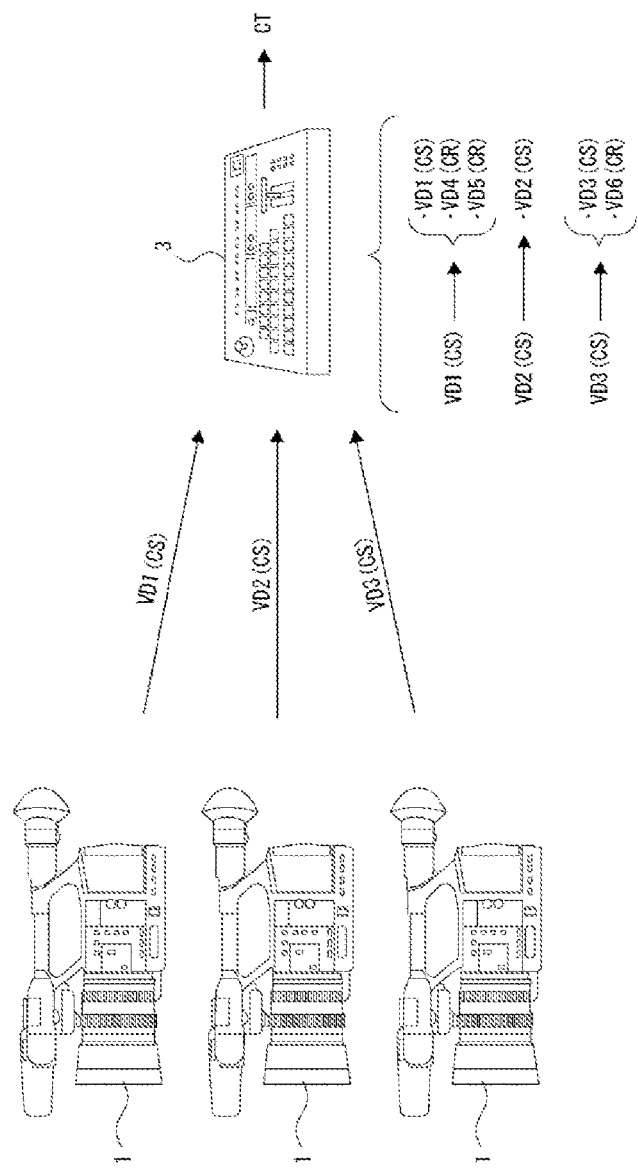
FIG. 2 is a diagram illustrating a configuration example of a device for realizing operations in the embodiment.

FIG. 2 illustrates an example in which a plurality of imaging devices 1 are used, and a switcher 3 has a function as an image processing device of the present technology. The switcher 3 is a device that performs switching for selecting an output image (main image) on input images of a plurality of systems. For example, the operator normally manually performs a switching operation, but in the present embodiment, it is assumed that manual switching and automatic switching can be selected.

In this example, the shots VD1, VD2, and VD3 are respectively transmitted from three imaging devices 1 to the switcher 3. Each of the imaging devices 1 outputs a captured image obtained by imaging an event or the like as one shot.

The imaging devices 1 transmit a moving image to the switcher 3 as a shot VD by, for example, wired communication or wireless communication.

The switcher 3 can generate a crop image from each of the shots VD1, VD2, and VD3. For example, shots VD4 and VD5 are generated from the shot VD1 as crop images. In addition, a shot VD6 is generated from the shot VD3 as a crop image. In this case, the switcher 3 can set the shots VD1, VD2, VD3, VD4, VD5, and VD6 as images that can be selected as main images and sequentially select the images as main images by switching processing to generate moving image content CT, and can perform transmission output, display output, recording, uploading, and the like. How many crop images are generated from one shot VD as a captured image can be arbitrarily determined by a user operation or the like. It is also arbitrary which captured image is used as a target to perform cropping processing.

Figure 3:
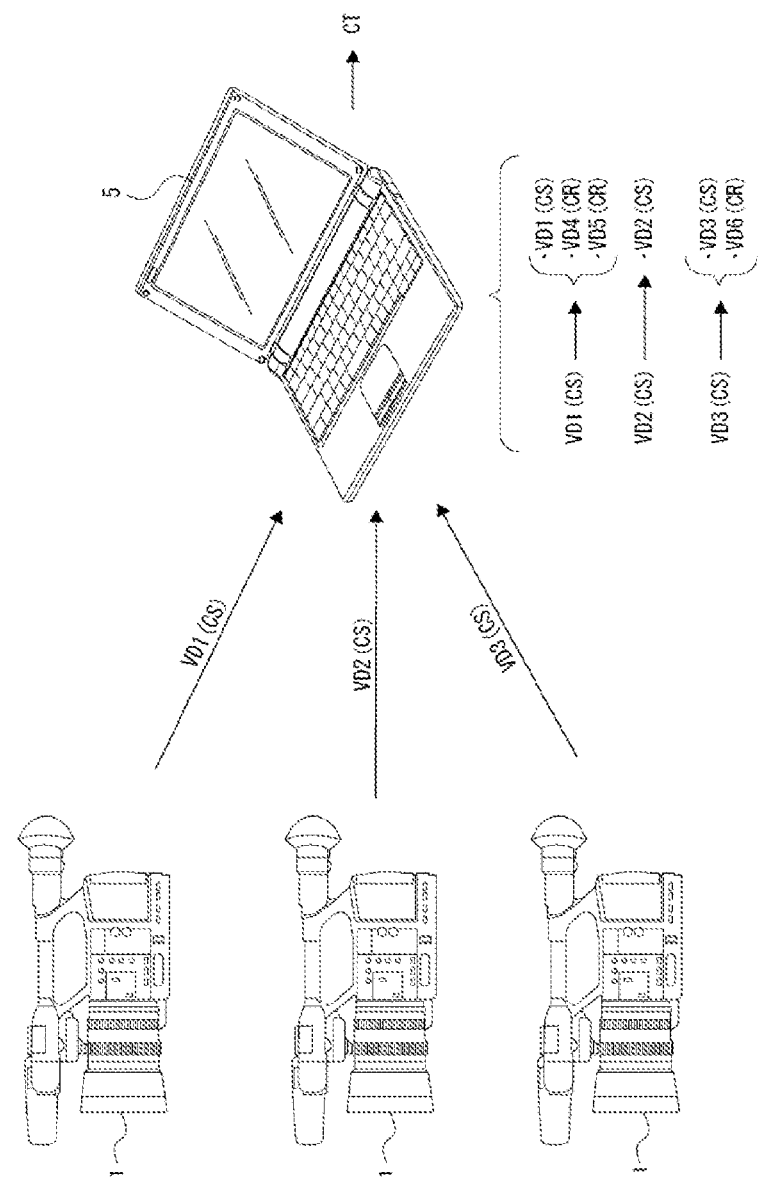
FIG. 3 is a diagram illustrating a configuration example of a device for realizing operations in the embodiment.

FIG. 3 is an example in which a plurality of imaging devices are used, and a computer device 5 has a function as the image processing device of the present technology. The computer device 5 is, for example, a personal computer or the like. However, the computer device 5 may be the portable terminal 2 described above. Also in this example, similarly to FIG. 2, it is assumed that the shots VD1, VD2, and VD3 are transmitted from three imaging devices 1. The computer device 5 generates a crop image from each of the shots VD1, VD2, and VD3 and sets, for example, the shots VD1, VD2, VD3, VD4, VD5, and VD6 as selectable images. Then, it is possible to sequentially select the images as main images by switching processing to generate moving image content CT, and to perform transmission output, display output, recording, uploading, and the like.

Communication between each imaging device 1 and the computer device 5 is performed by, for example, wired communication or wireless communication (for example, short-distance wireless communication or the like).

Figure 4:
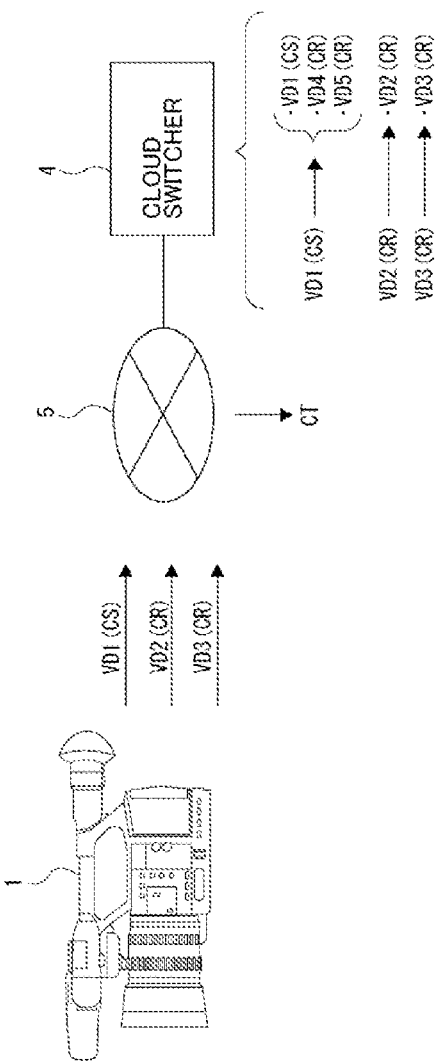
FIG. 4 is a diagram illustrating a configuration example of a device for realizing operations in the embodiment.

FIG. 4 is an example in which a cloud switcher 4 communicating with the imaging device 1 through a network 6 has a function as the image processing device of the present technology.

As the network 6, various forms such as the Internet, a Local Area Network (LAN), a Virtual Private Network (VPN), an intranet, an extranet, a satellite communications network, a Community Antenna TeleVision (CATV) communication network, a telephone line network, and a mobile communication network are assumed.

In this example, the imaging device 1 transmits the shot VD1 as a captured image and the shots VD2 and VD3 as crop images to the cloud switcher 4 through the network 6.

The cloud switcher 4 generates the shots VD4 and VD5 as crop images from the shot VD1. Then, moving image content CT is generated by sequentially switching the shots VD1, VD2, VD3, VD4, and VD5 by switching processing, and transmitted and output through the network 6.

Figure 5:
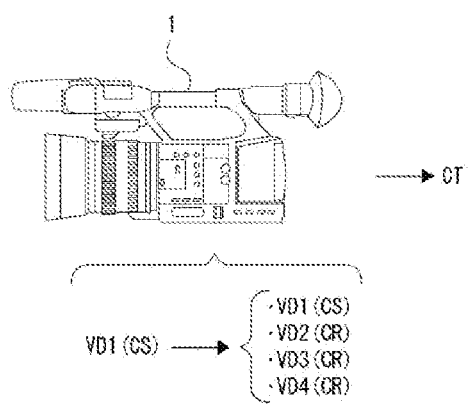
FIG. 5 is a diagram illustrating a configuration example of a device for realizing operations in the embodiment.

FIG. 5 is an example in which the imaging device 1 has a function as the image processing device of the present technology.

For example, in the imaging device 1, imaging is performed to generate the shot VD1 as a captured image and generate, for example, a plurality of shots VD2, VD3, and VD4 by internal cropping processing. Then, moving image content CT is generated by performing automatic switching processing on the shots VD1, VD2, VD3, and VD4 and is output.

Although examples of a specific device that can be the image processing device of the present embodiment have been described, but these are examples, and various other examples of a specific device are assumed.

Further, in the examples of FIGS. 1, 2, 3, and 4, an example of the shot VD which is transmitted and output from the imaging device 1 and combinations of the portable terminal 2 corresponding to the image processing device of the present embodiment, the switcher 3, the computer device 5, and the cloud switcher 4 are illustrated, but the present disclosure is not limited to the combinations. Since only an example of shot output and an example of a device serving as an image processing device are given, other combinations not illustrated in the drawing are also assumed.

In addition, the portable terminal 2, the switcher 3, the computer device 5, the cloud switcher 4, and the imaging device 1 in FIGS. 1, 2, 3, 4, and 5 perform switching processing and output moving image content CT, but may output a plurality of shots including a crop image without performing switching.

Further, in the device serving as the image processing device of the present disclosure as in the above-described example, a user can give an instruction for crop setting under the control of a user interface.

Hereinafter, examples of configurations and operations of the embodiment will be described assuming examples such as the imaging device 1 and the portable terminal 2 as illustrated in FIG. 1.

First, a configuration example of the imaging device 1 will be described with reference to FIG. 6.

Figure 6:
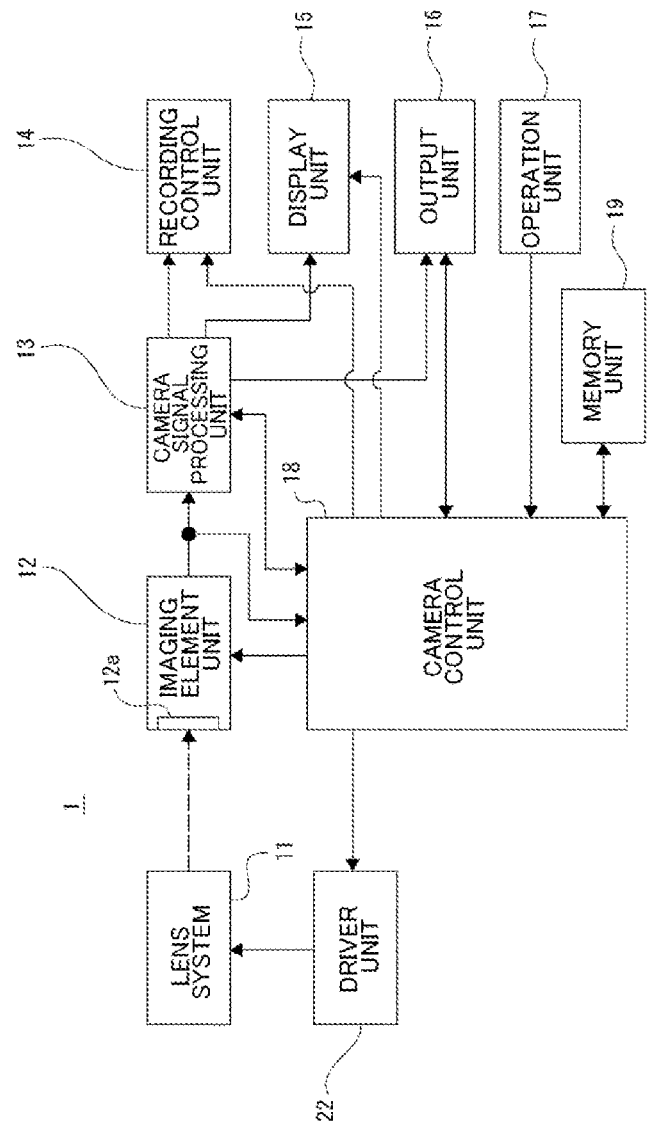
FIG. 6 is a block diagram of an imaging device in the embodiment.

As illustrated in FIG. 6, the imaging device 1 includes a lens system 11, an imaging element unit 12, a camera signal processing unit 13, a recording control unit 14, a display unit 15, an output unit 16, an operation unit 17, a camera control unit 18, a memory unit 19, and a driver unit 22.

The lens system 11 includes lenses such as a cover lens, a zoom lens, and a focus lens, an aperture mechanism, and the like. Light (incident light) from a subject is guided by the lens system 11 and condensed on the imaging element unit 12.

The imaging element unit 12 is configured to include, for example, an image sensor 12a (an imaging element) such as a complementary metal oxide semiconductor (CMOS) type or charge coupled device (CCD) type.

The imaging element unit 12 executes, for example, correlated double sampling (CDS) processing, automatic gain control (AGC) processing, and the like on an electric signal obtained by photoelectric conversion of light received by the image sensor 12a, and further performs analog/digital (A/D) conversion processing. Then, an imaging signal as digital data is output to the camera signal processing unit 13 or the camera control unit 18 at a subsequent stage.

The camera signal processing unit 13 is configured as an image processing processor by, for example, a digital signal processor (DSP). The camera signal processing unit 13 performs various types of signal processing on a digital signal (a captured image signal) obtained from the imaging element unit 12. For example, the camera signal processing unit 13 performs preprocessing, simultaneous processing, YC generation processing, resolution conversion processing, codec processing, and the like as camera processing.

In the preprocessing, clamping processing for clamping black levels of R, G, and B to a predetermined level, processing for correction between color channels of R, G, and B, or the like is performed on the captured image signal obtained from the imaging element unit 12.

In the simultaneous processing, color separation processing is performed so that image data for each pixel has all color components of R, G, and B. For example, in the case of an imaging element using color filters in a Bayer array, demosaic processing is performed as the color separation processing.

In the YC generation processing, a luminance (Y) signal and a color (C) signal are generated (separated) from image data of R, G, and B.

In the resolution conversion processing, resolution conversion processing is executed on the image data having been subjected to various types of signal processing.

In the codec processing in the camera signal processing unit 13, for example, coding processing for recording or communication, and file generation are performed on the image data having been subjected to the above-described various types of processing.

For example, processing for stream image data to be output as a moving image serving as one shot VD, generation of an image file for recording a moving image, and the like are performed.

Meanwhile, the camera signal processing unit 13 can also perform cropping processing to generate stream image data as one or a plurality of shots.

Further, although a sound processing system is not illustrated in FIG. 6, in fact, a sound recording system and a sound processing system are included, stream image data or an image file for recording may also include sound data together with image data as a moving image.

The recording control unit 14 performs, for example, recording and reproduction on a recording medium using a non-volatile memory. For example, the recording control unit 14 performs processing for recording an image file such as moving image data or still image data, a thumbnail image, or the like on the recording medium.

An actual form of the recording control unit 14 is conceivable in various ways. For example, the recording control unit 14 may be configured as a flash memory and a writing and reading circuit thereof built in the imaging device 1, or may be configured in the form of a card recording and reproduction unit that performs recording and reproduction access on a recording medium that can be attached to and detached from the imaging device 1, for example, a memory card (a portable flash memory or the like). In addition, the recording control unit 14 may be realized as a hard disk drive (HDD) or the like as a form built in the imaging device 1.

The display unit 15 is a display unit that performs various types of display to an imaging person, and is, for example, a display panel or a viewfinder using on a display device such as a liquid crystal panel (LCD: Liquid Crystal Display) or an organic electro-luminescence (EL) display disposed in a housing of the imaging device 1.

The display unit 15 causes various types of display to be executed on a display screen on the basis of an instruction of the camera control unit 18.

For example, the display unit 15 causes the recording control unit 14 to display a reproduced image of the image data read from the recording medium.

Further, image data of the captured image of which a resolution has been converted for display by the camera signal processing unit 13 may be supplied to the display unit 15, and the display unit 15 may perform display on the basis of the image data of the captured image in response to an instruction of the camera control unit 18. Thereby, a so-called through image (a monitoring image of a subject), which is a captured image that is being subjected to composition confirmation, is displayed. Further, the display unit 15 causes the display of various operation menus, icons, messages, or the like, that is, a graphical user interface (GUI) to be executed on a screen on the basis of an instruction of the camera control unit 18.

The output unit 16 performs data communication, network communication, or the like with an external device in a wired or wireless manner. Captured image data (for example, a stream image signal as a moving image) processed by the camera signal processing unit 13 is transmitted and output to, for example, an external information processing device, display device, recording device, reproduction device, or the like.

In particular, in the case of the present embodiment, the output unit 16 performs processing for transmitting a captured image that is being currently captured or a shot VD as a crop image to a device such as the portable terminal 2, the switcher 3, the computer device 5, or the cloud switcher 4 illustrated in FIGS. 1, 2, 3, and 4 as an example of the image processing device.

The operation unit 17 collectively indicates input devices allowing a user to perform various operation inputs. Specifically, the operation unit 17 indicates various operators (keys, a dial, a touch panel, a touch pad, and the like) provided in the housing of the imaging device 1.

A user operation is detected by the operation unit 17, and a signal according to the input operation is sent to the camera control unit 18.

The camera control unit 18 is constituted by a microcomputer (arithmetic processing device) including a central processing unit (CPU).

The memory unit 19 stores information or the like used for processing performed by the camera control unit 18. The memory unit 19 illustrated in the drawing comprehensively indicate, for example, a read only memory (ROM), a random access memory (RAM), a flash memory, and the like.

The memory unit 19 may be a memory area built in a microcomputer chip serving as the camera control unit 18, or may be constituted by a separate memory chip.

The camera control unit 18 executes a program stored in the ROM, flash memory, or the like of the memory unit 19 to control the overall imaging device 1.

For example, the camera control unit 18 controls operations of respective necessary units with respect to, for example, control of a shutter speed of the imaging element unit 12, an instruction for various types of signal processing in the camera signal processing unit 13, an imaging operation or a recording operation according to a user operation, a reproducing operation of recorded image files, an operation of the lens system 11 such as zooming, focusing, and aperture adjustment in a lens barrel, an operation of a user interface, and the like.

The RAM in the memory unit 19 is used to temporarily store data, programs, and the like as a work area when various types of data processing of the CPU of the camera control unit 18 are performed.

The ROM or the flash memory (a nonvolatile memory) in the memory unit 19 is used to store application programs for various operations, firmware, and the like, in addition to an operating system (OS) allowing the CPU to control each unit and content files such as image files.

For example, a motor driver for a zoom lens drive motor, a motor driver for a focus lens drive motor, a motor driver for an aperture mechanism motor, and the like are provided in the driver unit 22.

These motor drivers apply a drive current to the corresponding driver in response to an instruction given from the camera control unit 18, and execute movement of a focus lens and a zoom lens, opening and closing of aperture blades of the aperture mechanism, and the like.

Figure 7:
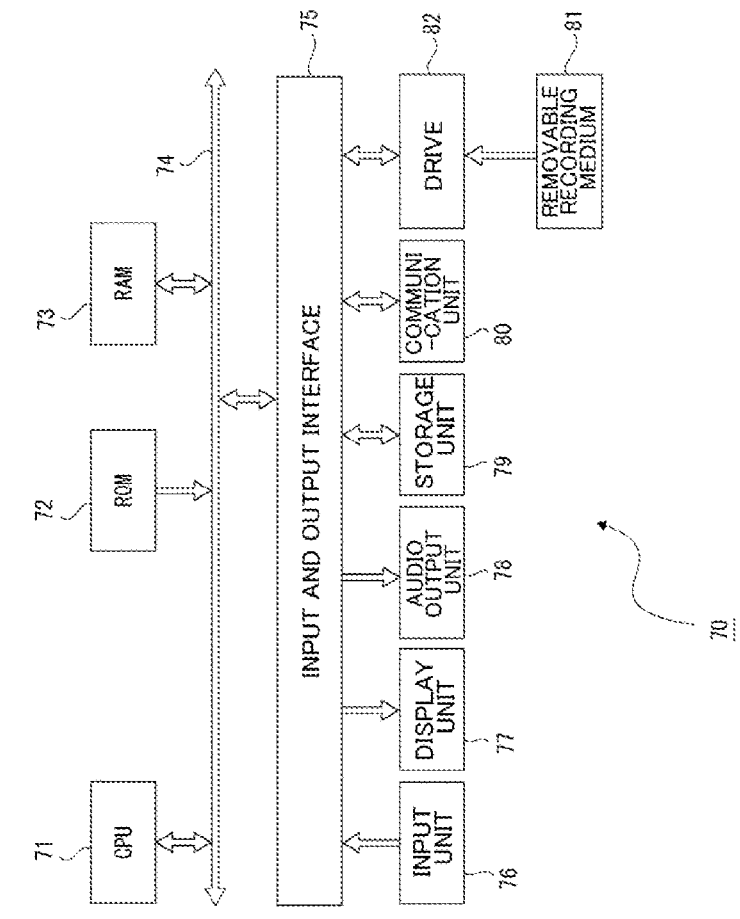
FIG. 7 is a block diagram of an information processing device in the embodiment.

Next, a configuration of an information processing device 70 that functions as the image processing device of the present embodiment is illustrated in FIG. 7.

For example, the portable terminal 2 and the computer device 5 are configured as the information processing device 70. The switcher 3, the cloud switcher 4, and the like can also function as the image processing device of the present embodiment by having the same configuration as the information processing device 70.

In FIG. 7, a CPU 71 of the information processing device 70 executes various types of processing according to a program stored in a ROM 72 or a program loaded from a storage unit 79 into a RAM 73. The RAM 73 also appropriately stores data and the like necessary for the CPU 71 to execute various types of processing.

The CPU 71, the ROM 72, and the RAM 73 are connected to each other via a bus 74. An input and output interface 75 is also connected to the bus 74.

An input unit 76 constituted by an operator or an operation device is connected to the input and output interface 75.

For example, various operators or operation devices such as a keyboard, a mouse, keys, a dial, a touch panel, a touch pad, and a remote controller are assumed as the input unit 76.

A user operation is detected by the input unit 76, and a signal corresponding to the input operation is interpreted by the CPU 71.

Further, a display unit 77 constituted by an LCD, an organic EL panel, or the like, and a sound output unit 78 constituted by a speaker or the like are connected to the input and output interface 75 as one body or separate bodies.

The display unit 77 is a display unit that performs various types of display, and is constituted by, for example, a display device provided in the housing of the information processing device 70, a separate display device connected to the information processing device 70, or the like.

The display unit 77 executes the display of various images for image processing, a moving image to be processed, and the like on a display screen on the basis of an instruction of the CPU 71. Further, the display unit 77 displays various operation menus, icons, messages, or the like, that is, a graphical user interface (GUI) on the basis of an instruction of the CPU 71.

The storage unit 79 constituted by a hard disk, a solid-state memory, or the like, or a communication unit 80 constituted by a modem or the like may be connected to the input and output interface 75.

The communication unit 80 performs communication processing via a transmission path such as the Internet, and performs communication with various devices through wired/wireless communication, bus communication, or the like.

A drive 82 is also connected to the input and output interface 75 as necessary, and a removable recording medium 81 such as a magnetic disk, an optical disc, a magneto-optical disc, or a semiconductor memory is appropriately mounted in the drive 82.

Using the drive 82, it is possible to read data files such as an image file, various computer programs, or the like from the removable recording medium 81. The read data file is stored in the storage unit 79 or an image or a sound included in the data file is output by the display unit 77 or the sound output unit 78. Further, the computer program or the like read from the removable recording medium 81 is installed in the storage unit 79, as necessary.

In the information processing device 70, for example, software for processing in the image processing device of the present disclosure can be installed via network communication using the communication unit 80 or via the removable recording medium 81. Alternatively, the software may be stored in the ROM 72, the storage unit 79, or the like in advance.

2. Example of Functional Configuration of Image Processing Device

Figure 8:
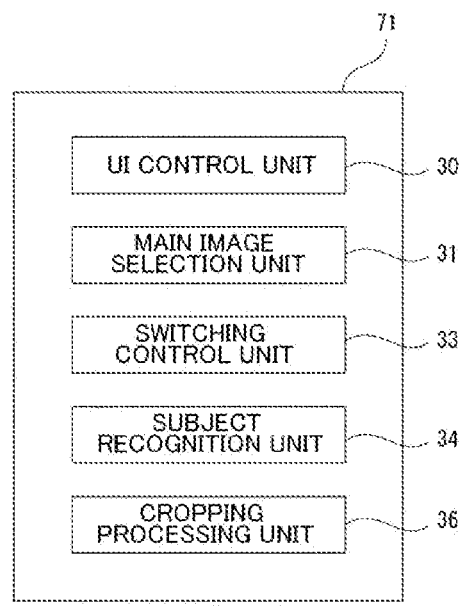
FIG. 8 is a diagram illustrating a functional configuration of the image processing device in the embodiment.

The image processing device of the present embodiment is realized, for example, by the CPU 71 of the information processing device 70 including a functional configuration illustrated in FIG. 8 by software (application program).

That is, the information processing device 70 (or the CPU 71) functions as the image processing device of the present embodiment by including at least a user interface control unit (UI control unit) 30 and a cropping processing unit 36.

In addition, the information processing device 70 (or CPU 71) may further include a switching control unit 33.

Further, the information processing device 70 (or the CPU 71) may also include either one or both of a main image selection unit 31 and a subject recognition unit 34.

For example, the portable terminal 2 in FIG. 1 and the computer device 5 in FIG. 3 constitute the information processing device 70 illustrated in FIG. 7, and the CPU 71 has the functional configuration illustrated in FIG. 8 to function as the image processing device of the present embodiment.

In addition, the switcher 3 in FIG. 2 and the cloud switcher 4 in FIG. 4 has a configuration equivalent to FIG. 7 (or a configuration equivalent to at least the CPU 71), and the CPU 71 has the functional configuration illustrated in FIG. 8 to function as the image processing device of the present embodiment.

Further, in a case where the imaging device 1 functions as an image processing device as illustrated in FIG. 5, for example, the camera signal processing unit 13 or the camera control unit 18 illustrated in FIG. 6 includes the functional configuration illustrated in FIG. 8 to function as the image processing device of the present embodiment.

For example, the image processing device of the present embodiment which is realized in this manner is a device that generates a shot as a crop image as a plurality of shots provided for switching (switching of a main image) at the time of the production of a moving image, or performs the setting of a crop region in accordance with a user operation or the like, and the like. In particular, regarding the setting of a crop region, a crop setting environment with good operability is provided by preparing an automatic mode, a semi-automatic mode, or a manual mode to be described later.

Each function in FIG. 8 will be described.

A UI control unit 30 has a function of performing control for displaying a monitor screen for a switching operation and a screen for crop setting and control for receiving a user operation, for example, on the display unit 77 or the like. Specifically, the UI control unit 30 performs display control processing of a multi-view screen 100 (first screen) including a captured image display region for displaying a captured image and a crop image display region for displaying a crop image which is cut out by the cropping processing unit 36.

In addition, the UI control unit 30 performs display control processing for making display transition from the multi-view screen 100 to a crop setting screen 200 (second screen) for setting a crop region obtained from a captured image.

In addition, the UI control unit 30 performs processing for receiving a first user operation of designating at least one set of coordinates related to a crop region in the crop setting screen 200 and a second user operation of designating a subject related to a crop region.

In addition, the UI control unit 30 performs processing for setting a crop region on the basis of the first user operation or the second user operation.

The main image selection unit 31 has a function of selecting one image to be set as a main image from among a plurality of shots VD.

That is, processing for selecting an appropriate shot as the next shot VD to be used in moving image content is performed.

The switching control unit 33 has a function of switching a main image. For example, the switching control unit 33 controls a switching operation of making a shot VD serving as a main image kept as a main image for a certain period of time (for example, approximately 3 seconds to 7 seconds) and then switching the shot VD to the next shot VD.

Various examples of a switching timing for a main image according to the switching control unit 33 are conceivable. For example, the switching control unit 33 can perform determination of a switching timing in accordance with contents of each shot VD (subject recognition), a duration length, changes in crop setting, and the like.

In addition, the switching control unit 33 may also perform determination of a switching timing in accordance with a user operation.

The cropping processing unit 36 has a function of performing processing for cutting out a portion of a region of a captured image.

The cropping processing unit generates a crop image by cutting out a portion of a region from a captured image which is a crop source, on the basis of setting information of a crop region according to a user's intention acquired by the UI control unit 30 and the selection of an automatic mode, a semi-automatic mode, or a manual mode.

Figure 9:
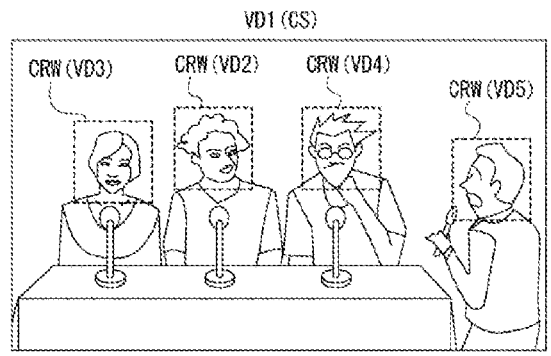
FIG. 9 is a diagram illustrating a captured image and a crop image in the embodiment.
Figure 9:
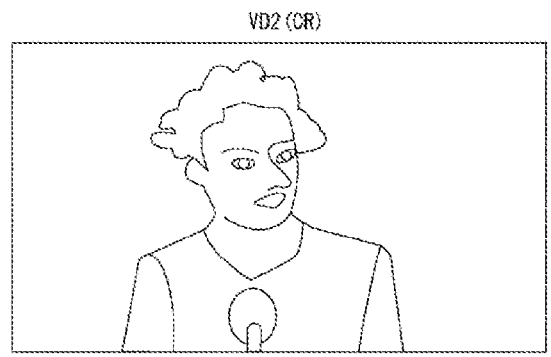
Figure 9:
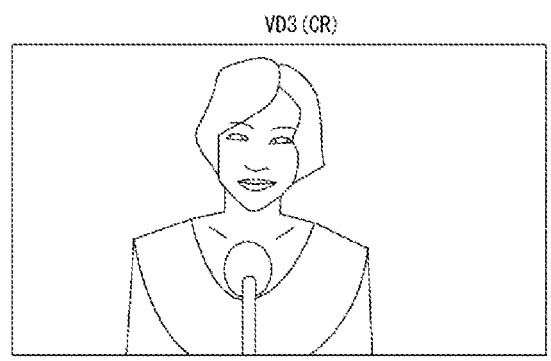

An example of a crop image is illustrated in FIG. 9. This is an example of an image obtained on the assumption that an interview scene is imaged by one imaging device 1, and broadcasting and the like are performed.

The cropping processing unit 36 cuts out, for example, a portion of a region from one captured image shown as a shot VD1 to generate a shot VD as a crop image. Here, for example, an example in which respective subject persons are cut out from a captured image in which four persons are shown to generate shots VD2, VD3, VD4, and VD5 as four crop images is shown.

In this case, it is assumed that, for example, four regions indicated by crop frames CRW are cut out to be set as the shots VD2, VD3, VD4, and VD5 in the image of the shot VD1 which is a captured image. The shots VD2 and VD3 are illustrated as crop images in the drawing.

The cropping processing unit 36 executes processing for generating one or a plurality of crop images by cutting out a portion of one image in this manner in accordance with, for example, various settings (crop region setting, crop mode setting, and the like) based on a user operation recognized by the UI control unit 30.

In a case where a crop mode is set to be an automatic mode, the cropping processing unit 36 automatically determines, for example, a crop region (a region of a crop frame CRW) for each frame of a moving image and performs cutting-out. Subject recognition is performed for cropping processing in the automatic mode.

Further, in the case of a semi-automatic mode, a user designates a subject (for example, a subject person), whereby cut-out processing for performing cutting-out centering on the subject is performed.

For the processing in the automatic mode and the semi-automatic mode, it is necessary to perform the recognition of a subject within a screen, the determination of a region of a subject which is a candidate for cutting-out within a screen, and the like.

For this reason, the image processing device is equipped with a function as the subject recognition unit 34 as illustrated in FIG. 8.

The subject recognition unit 34 has a function of performing processing such as image analysis on an image of a supplied shot VD and recognizing a subject in the shot VD.

Processing for detecting a subject by, for example, face detection, person detection, or posture estimation and tracking the subject may be performed.

In addition, processing for performing face identification (identification of an individual) and recognizing who a subject is (whether or not the subject is an important subject such as a leading role in an event being imaged) may be performed.

In addition, processing for detecting a speaker from the movement of a mouth which is detected by face part detection may be performed.

In addition, the subject recognition unit 34 extracts shot information from a recognition result.

The shot information is information regarding who is shown in an image, and information such as composition (arrangement) and camera work is assumed.

The subject information regarding who is shown in an image is about a subject which is shown large in the image.

The composition (arrangement) information is a type such as a bird's eye shot, zoom-out (a full shot, a knee shot), or zoom-in (a waist shot, a bust shot, an up shot), or a shot VD is information regarding which of composition and subject arrangement types, such as a so-called sun-flag composition and the rule of thirds, correspond to, or the like. In addition, a type such as a subject size within an image of a shot VD is also included in composition information.

The camera work information is information indicating the camera work itself such as fixed, follow, pan, zoom, or dolly.

It is also possible to select a shot to be a main image next and determine a candidate for a crop region on the basis of these pieces of shot information.

In addition, the subject recognition unit 34 can determine an image classification for the shot VD on the basis of a recognition result and shot information.

For example, as the image classification, all shots VD can also be classified into a main subject shot (a leading role shot/a speaker shot), a minor role shot, a full shot (a large number of persons or a front shot), and the like.

It is conceivable that the determination of such an image classification based on shot information is performed on the basis of machine learning.

In addition, a full shot may be determined on conditions such as a frontmost image, a most zoomed-out image, and an image with the largest number of subjects, or may be specified on the basis of a user's designation. For example, in a case where the imaging device 1 that performs imaging by zooming-out from the front of the subject at all times is disposed, it is also conceivable that a user sets a shot VD obtained by the imaging device 1 as a full shot at all times.

For example, in the case of FIG. 9, an image classification for shots is as follows. A shot VD1 is a shot obtained by imaging the entire interview scene by zooming-out from the front thereof and corresponds to a "full shot".

A shot VD2 is an image obtained by cutting out an individual interviewee, but at this point, a person shown in this image is a speaker. For example, in a case where a speaker is determined in accordance with the movement of a mouth detected from an image, or the like, this shot VD2 is determined to be a "speaker shot" or a "main subject shot" at the present point in time. A shot VD determined to be a speaker shot is changed whenever a speaker changes.

A shot VD3 is a shot of a person other than a speaker, and thus the shot is determined to be a "minor role shot" at this point in time. In a later scene in which this person talks, the shot VD3 is determined to be a "speaker shot" or a "main subject shot".

It is also assumed that switching is performed by such image classification.

Meanwhile, the processing of the subject recognition unit 34 may not be necessarily performed within the image processing device.

An example of a flow of processing of the image processing device having the above-described function illustrated in FIG. 8 will be described with reference to FIG. 10. For example, it is assumed that a shot VD1 is supplied to the image processing device from one imaging device 1.

The subject recognition unit 34 performs subject recognition processing on the shot VD1. The subject recognition processing performs processing for determining a subject to be cropped and determining a candidate for a crop region on the basis of subject recognition through image analysis of the shot VD1. In addition, for example, it is also assumed that a face region, a whole body region, a bust-up region, and the like of a subject person are determined.

The cropping processing unit 36 performs cut-out processing for an appropriate region from each frame of the shot VD1. The cut-out images (crop images) are, for example, shots VD2, . . . , and VDn.

Meanwhile, in a case where the cropping processing unit 36 is in a manual mode, cropping processing for a region designated by a user operation is performed in response to an instruction given from the UI control unit 30.

Further, in a case where cropping processing unit 36 is in a semi-automatic mode, automatic setting of a crop region is performed on a subject designated by a user operation instructed by the UI control unit 30 on the basis of results of subject recognition, and cropping processing is performed.

Further, in a case where the cropping processing unit 36 is in an automatic mode, a subject to be cropped is determined on the basis of results of subject recognition, the automatic setting of a crop region of the subject is performed, and cropping processing is performed.

For these processes, the UI control unit 30 notifies the cropping processing unit 36 of control information CTL including instruction information according to crop mode information or user operation information.

The shot VD1 which is a captured image being a crop source and the shots VD2, . . . , and VDn which are crop images are supplied to the switching unit 40 and switched. That is, any one of the shots VD1, VD2, . . . , and VDn is selected by the switching unit 40 and is output as a main image MP at the present point in time.

The switching of the shot VD is performed by the switching unit 40, and thus main images of moving image content to be output are sequentially switched, thereby making a viewer less likely to get bored.

Figure 11:
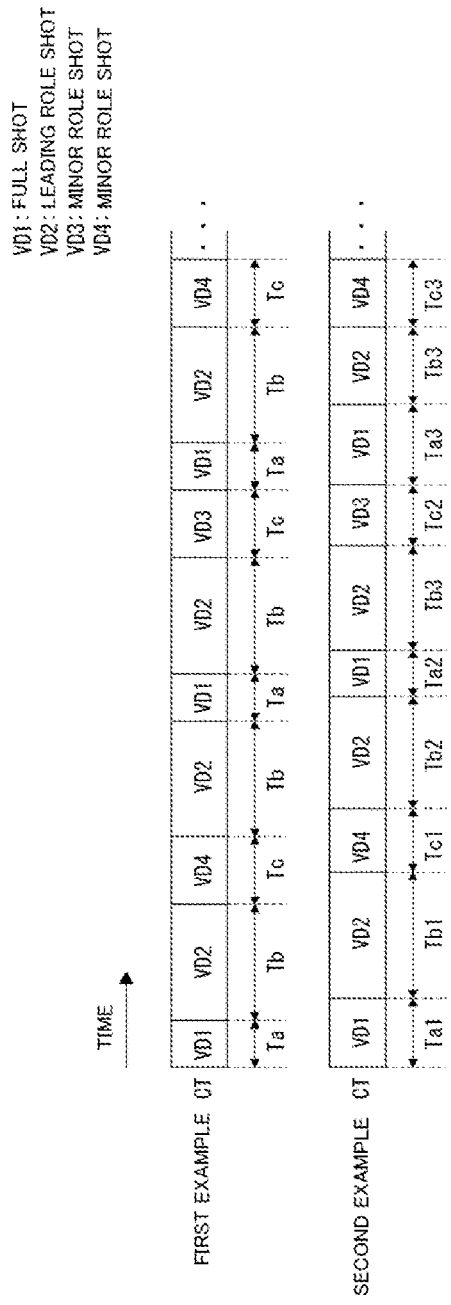
FIG. 11 is a diagram illustrating a shot switching operation in the embodiment.

A first example and a second example in FIG. 11 schematically show the switching of main images as moving image content CT.

A horizontal direction in the drawing represents a time axis, and a state where shots VD1, VD2, VD3, and VD4 are sequentially switched as main images MP on the time axis and output is shown as one moving image content.

For example, the shots are switched while being output for a period of time of approximately three to seven seconds. In particular, even when a plurality of crop images are generated from one captured image, the crop images are switched to be moving image content, and thus the moving image content is likely to have more interesting and realistic contents depending on a viewer.

Figure 10:
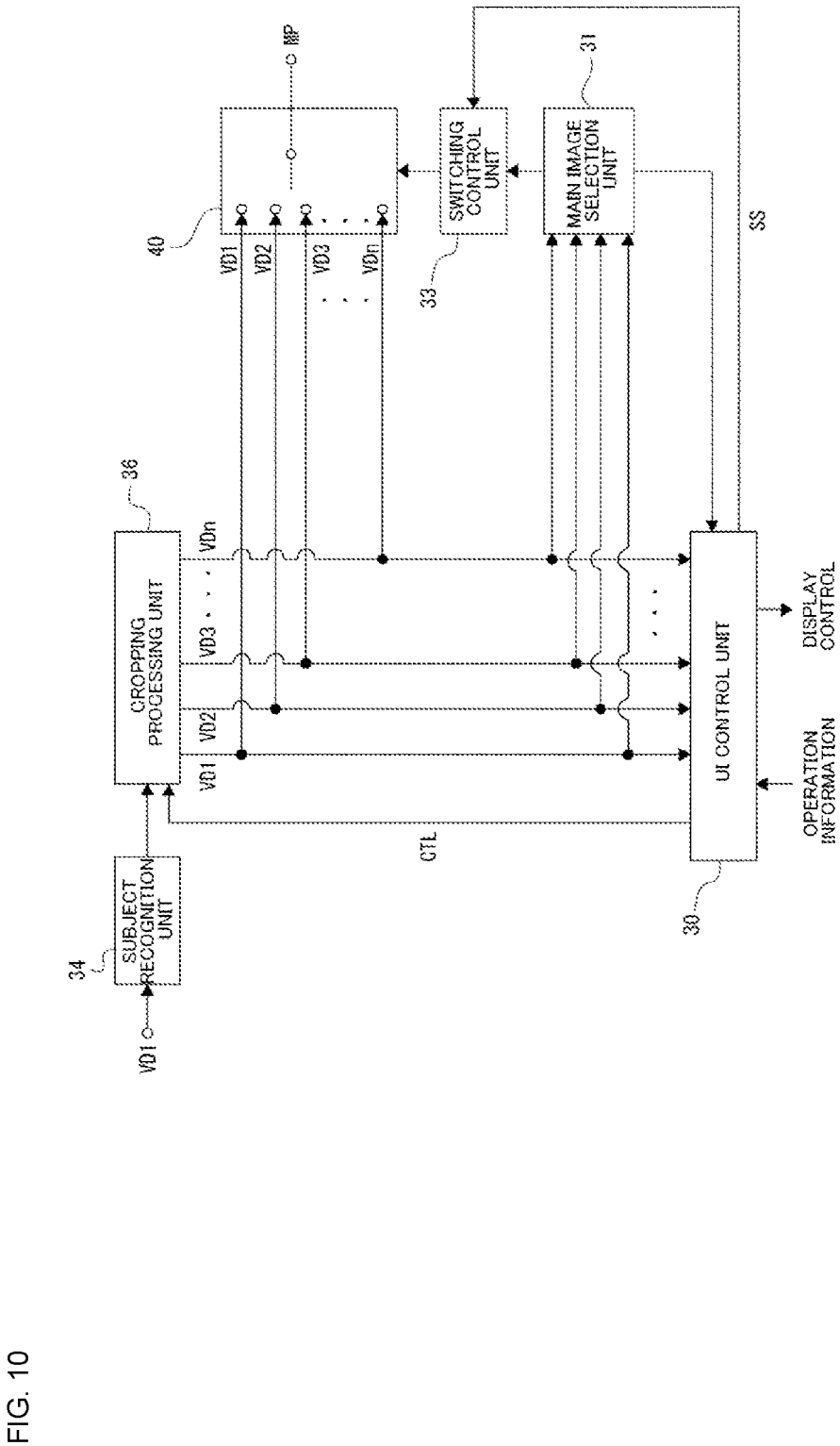
FIG. 10 is a diagram illustrating cropping processing and switching processing for a captured image in the embodiment.

For such switching, the switching control unit 33 illustrated in FIG. 10 determines a switching timing through switching determination processing and controls a switching operation of the switching unit 40 at the switching timing.

That is, the switching control unit 33 can control the switching unit 40 so that a shot VD instructed by a user is output as a main image MP in accordance with user manual switching operation information SS being input from the UI control unit 30.

In addition, switching and the selection of a main image may be automatically performed regardless of a user operation.

For example, as illustrated in the drawing, it is conceivable that the shots VD1, VD2, . . . , and VDn, or shot information, image classification information, and the like thereof are supplied to the main image selection unit 31, and thus the main image selection unit 31 selects the next main image.

When the main image selection unit 31 selects the next main image, the main image selection unit 31 notifies the UI control unit 30 of the selected main image to display the main image, or notifies the switching control unit 33 of the selected main image to perform switching at a predetermined timing.

Various example of processing for selecting a shot to be the next main image by the main image selection unit 31 are conceivable.

For example, shots VD may be regularly selected in order. It is conceivable that a duration length when each shot is set to be a main image is a fixed time or a variable time.

Such moving image content can be more substantial as content than in a case where only whole screen is simply captured continuously by switching images having various angles, up images of subject persons, and the like. However, images are regularly switched in a specific order at all times, and thus a viewer tends to feel that a moving image is boring.

Consequently, it is also considered that the order of selecting shots VD is randomized. It is possible to slightly alleviate a viewer's feeling of boredom.

As a more preferable example, it is conceivable to make a duration length different depending on an image classification of each shot.

That is, regarding a duration length, a full shot is set to be a time Ta, a leading role shot is set to be a time Tb, and a minor role shot is set to be a time Tc. In addition, a relationship of Tb>Tc>Ta is set. Alternatively, a relationship of Tb>Ta>Tc may be set. That is, the duration length of the leading role shot is set to be longest. The duration length of any one of the minor role shot and the full shot can be set to be shortest.

As an example, regarding a duration length, the leading role shot is set to 8 seconds, the minor role shot is set to 6 seconds, and the full shot is set to 4 seconds, or the like.

Then, a shot VD selected by the main image selection unit 31 is output as a main image MP for each duration length which is set in accordance with an image classification PD of the shot VD.

The first example illustrated in FIG. 11 is an example in which the shot VD1 is a full shot, the shot VD2 is a leading role shot, and the shots VD3 and VD4 are minor role shots.

That is, the shots are sequentially switched so that the shot VD1 is first continued for a time Ta, the shot VD2 is then continued for a time Tb, and then the shot VD4 is continued for a time Tc. In this case, selection performed by the main image selection unit 31 is performed neither in order nor completely randomly.

In this manner, moving image content CT that makes it difficult for a viewer to get bored because of switching conforming to the intention of moving image production and an unfixed switching timing can be easily realized by automatic switching.

In particular, a leading role subject is sufficiently featured by making it easy to select a leading role shot as a main image MP and increasing a duration length, and a moving image that gives a viewer a good feeling of tension at the time of switching between scenes is realized.

The second example illustrated in FIG. 11 is an example in which more dynamic moving image content is realized by further changing a switching timing (in other words, a duration length as a main image MP).

That is, the second example is an example in which, regarding a time Ta of a full shot, a time Tb of a leading role shot, and a time Tc of a minor role shot as duration lengths, a relationship of Tb>Tc>Ta or Tb>Ta>Tc is set similar to the first example, but an interval is given between duration lengths of the respective image classifications.

For example, in the case of the leading role shot, a duration length varies by times Tb1, Tb2, Tb3, and the like. Similarly, the duration length of the minor role shot is set to times Tc1, Tc2, Tc3, and the like, and the duration length of the full shot is set to times Ta1, Ta2, Ta3, and the like.

As an example, regarding a duration length, the full shot is set to be between 3.5 seconds and 4 seconds, the minor role shot is set to be between 4 seconds and 6 seconds, and the leading role shot is set to be between 6 seconds and 8 seconds, or the like.

For example, regarding the duration length of the leading role shot, the times Tb1, Tb2, and Tb3 are randomly set to be between 6 seconds and 8 seconds. This is the same as for the minor role shot and the full shot.

Thereby, the periodicity of a switching timing of the shot VD becomes weaker, and a moving image tends to have a feeling of tension.

Meanwhile, a relationship of Tb>Tc>Ta or Tb>Ta>Tc may not be necessarily established at all times. For example, the full shot may be set to be between 3 seconds and 5 seconds, the minor role shot may be set to be between 4 seconds and 6 seconds, the leading role shot may be set to be between 5 seconds and 8 seconds, or the like by making the shots slightly overlap each other.

The UI control unit 30 in FIG. 10 presents information to a user related to a switching operation or cropping processing and receives a user operation. Specifically, the shots VD received from the cropping processing unit 36 or the state of switching is displayed on a multi-view screen, or a screen for crop setting is provided.

Hereinafter, display performed by the UI control unit 30 and a user's operation input will be described in detail.

3. Multi-View Screen

Figure 12:
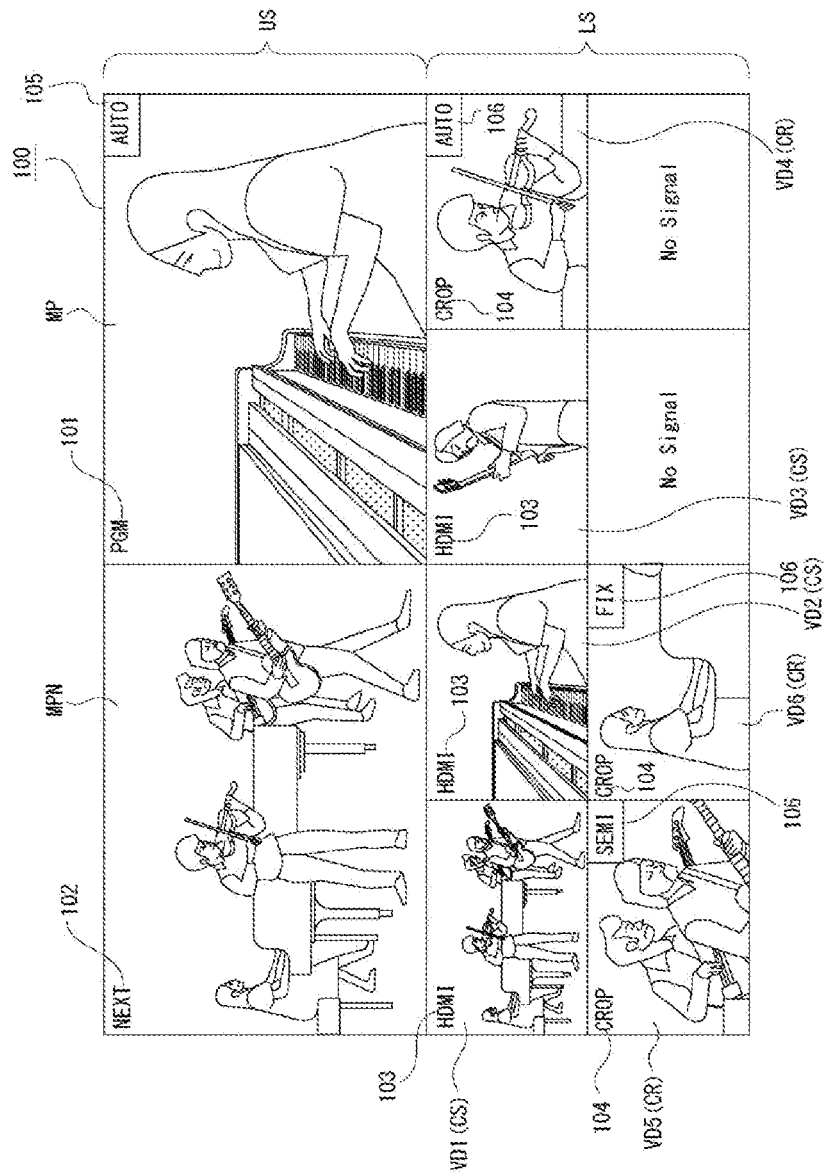
FIG. 12 is a diagram illustrating a multi-view screen in the embodiment.

FIG. 12 illustrates an example of the multi-view screen 100 displayed on the display unit 77 (or the display unit 15) under the control of the UI control unit 30.

The multi-view screen 100 is a screen for causing a user to monitor an image of each shot VD and clearly showing the present main image and the next main image to inform the state of switching.

The multi-view screen 100 in FIG. 12 is roughly divided into an upper side (screen upper portion) US and a lower side (screen lower portion) LS that are set.

The state of switching is presented on the upper side US. For example, a shot VD which is being currently output as a main image MP is displayed on the right side of the upper side US.

A main image presentation unit 101 is provided within the shot image, and "PGM" indicating the present main image is displayed. For example, in the case of live relay broadcasting, this main image is an image which is being currently viewed by a viewer.

In addition, a shot VD which is scheduled to be output next as a main image MP (next image MPN) is displayed on the left side of the upper side US of the screen. For example, a shot VD which is manually reserved as the next main screen by a user (operator), or a shot which is selected as the next main image by automatic selection is displayed. A next presentation unit 102 is provided within a shot image, and "NEXT" indicating the next main image is displayed.

A plurality of shots VD1, VD2, VD3, . . . that are input as switching targets are displayed on the lower side LS of the screen in respective regions smaller than those in the image on the upper side US.

In this example, regions for displaying eight shots VD are prepared, and six shots VD1, VD2, VD3, VD4, VD5, and VD6 are input as switching targets at present. Meanwhile, in a region having no shot image, "No Signal" is displayed.

On the lower side LS, a captured image display region and a crop image display region (cut-out image display region) are prepared in accordance with an input image at that time.

As described above, a shot VD to be switched includes an original captured image captured by the imaging device 1 or a crop image. Here, it is assumed that the shots VD1, VD2, and VD3 are captured images, and the shots VD4 and VD5, and VD6 are crop images.

In this example, in the regions in which the shots VD1, VD2, and VD3 being captured images are displayed are displayed, an image type presentation unit 103 is provided, and image types thereof are displayed. Here, an example in which "HDMI" indicating an image transmitted by each shot VD using a High-Definition Multimedia Interface (HDMI) is displayed is shown.

Further, in the regions in which the shots VD4, VD5, and VD6 being crop images are displayed, a crop presentation unit 104 is provided, and "CROP" is displayed, whereby it is displayed that the images are crop images.

In this example, the display regions of the shots VD1, VD2, and VD3 are captured image display regions, and the display regions of the shots VD4, VD5, and VD6 are crop image display regions.

Meanwhile, all shots VD that are input as switching targets may be captured images, or all shots may also be crop images. For this reason, the captured image display region and the crop image display region on the lower side LS are not fixed regions, and both the regions are not necessarily provided. The captured image display region and the crop image display region are prepared in accordance with the types and number of shots VD to be input at that time.

Further, in addition to these images, a switching mode is presented by a switching mode presentation unit 105, and a crop mode is presented by a crop mode presentation unit 106.

The switching mode presentation unit 105 is provided to be superimposed on an image of a shot VD which is set as a main image, which presents whether the switching of a main image is performed automatically or manually. In the example illustrated in the drawing, "AUTO" is displayed, which indicates that automatic switching is being performed.

The switching mode presentation unit 105 is displayed as, for example, "MANUAL", which may indicate that manual switching is being performed.

Meanwhile, the switching mode presentation unit 105 may be configured as an operator for designating a switching mode. For example, the display of "AUTO" is configured as an operation button, and automatic switching is started by the display of "AUTO" being operated by clicking or the like. In addition, the automatic switching is terminated by operating the display again.

In this case, it is conceivable to present that automatic switching is being performed by setting the display of "AUTO" in red or the like during a period in which automatic switching is being performed, and to set the display of "AUTO" recognized as a button for instructing automatic switching by weakening the display of "AUTO" or indicating an operable state during a period in which manual switching is being performed.

The crop mode presentation unit 106 is provided to be superimposed on an image of a shot VD which is a crop image.

In the drawing, as the crop mode presentation unit 106, an example in which "AUTO" is displayed for the shot VD4, "SEMI" is displayed for the shot VD5, and "FIX" is displayed for the shot VD6 is illustrated.

The "AUTO" indicates that an image is a crop image which is set in an automatic mode.

The "SEMI" indicates that an image is a crop image which is set in a semi-automatic mode.

The "FIX" indicates that an image is a crop image which is set in a manual mode.

A user (operator) can confirm the state of a switching operation, an image which is input for switching, and contents of a crop image through such multi-view screen 100.

Meanwhile, the screen example illustrated in FIG. 12 is just an example, and a configuration of the multi-view screen 100 and contents of display are not limited thereto. Other screen examples are illustrated in FIGS. 13 and 14.

Figure 13:
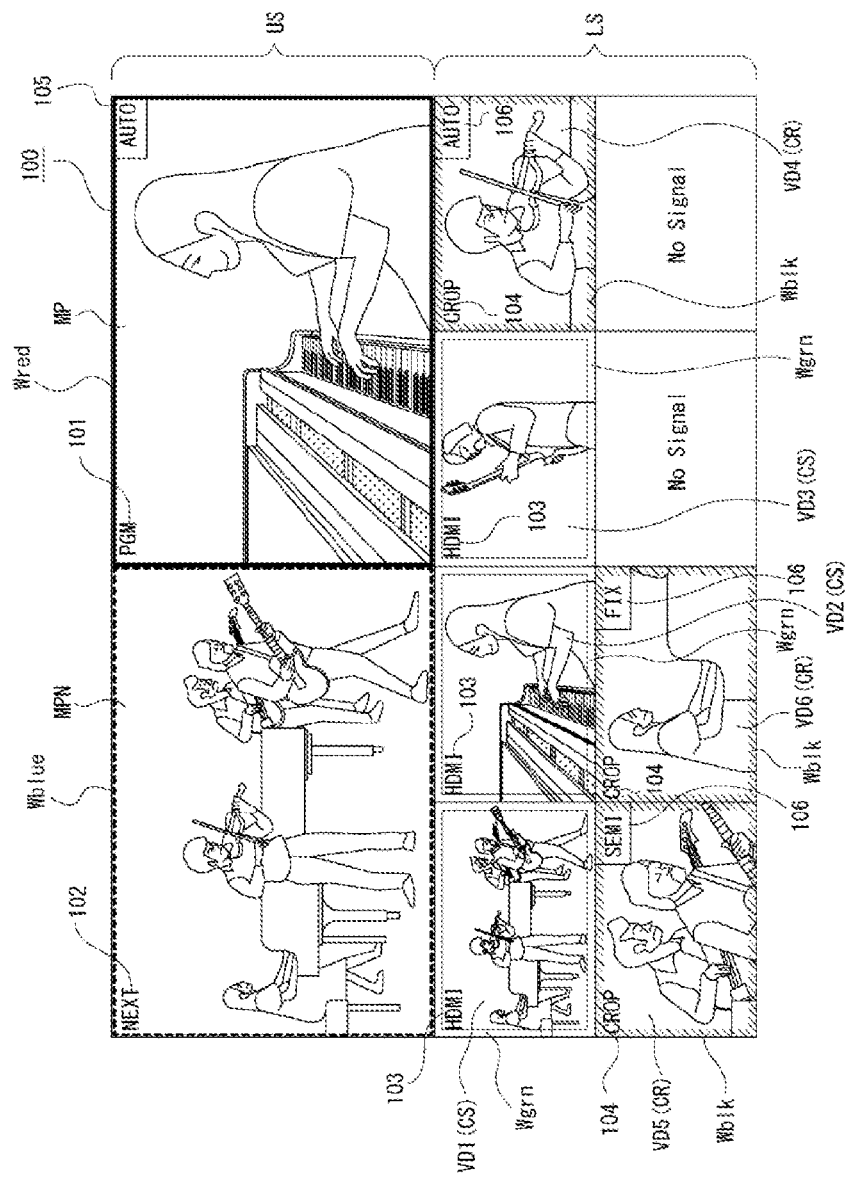
FIG. 13 is a diagram illustrating another example of a multi-view screen in the embodiment.
Figure 14:
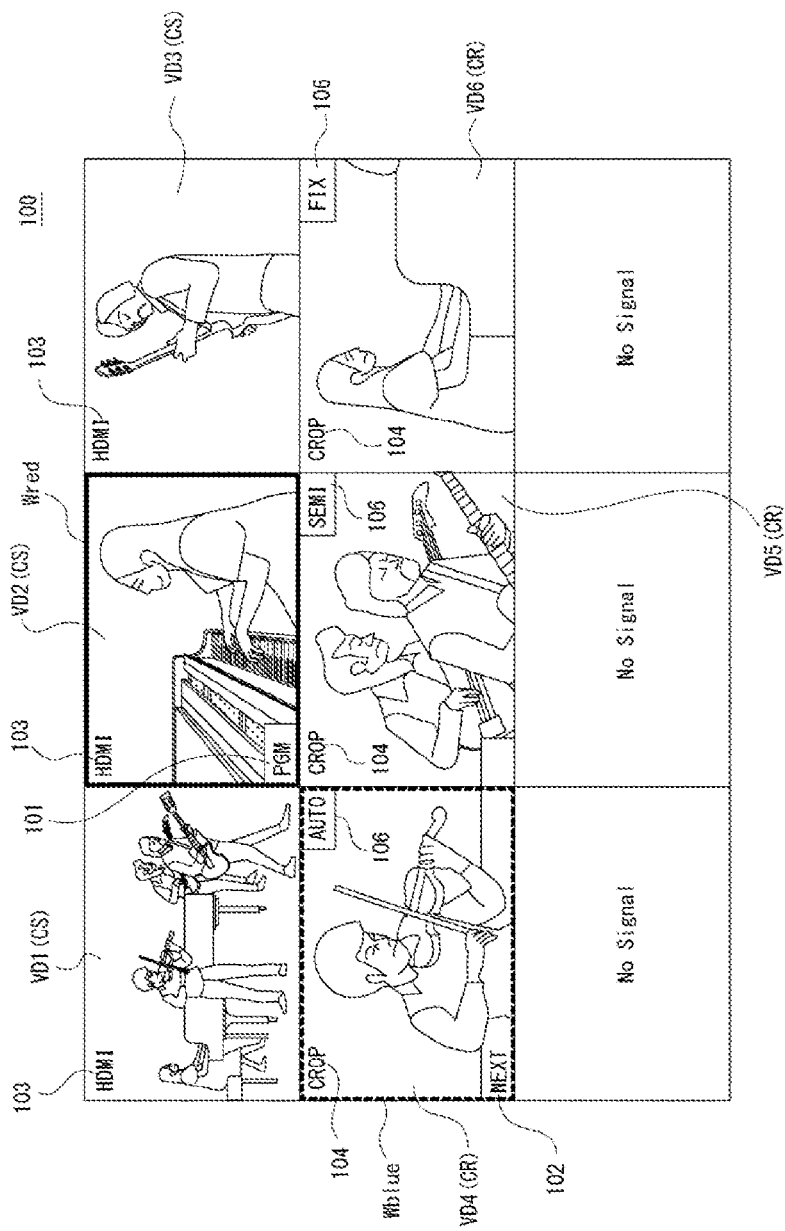
FIG. 14 is a diagram illustrating still another example of a multi-view screen in the embodiment.

FIG. 13 is similar to FIG. 12 in terms of screen configurations of an upper side US and a lower side LS, but illustrates an example in which the states and meanings of respective images are displayed to be clearly distinguished from each other.

Regarding a present main image displayed on the right side of the upper side US, it is clearly presented to a user that an image is the present main image, for example, by surrounding the image by a red frame Wred (indicated by a bold line in the drawing).

Regarding a next main image displayed on the left side of the upper side US, it is clearly presented to a user that an image is the next main image, for example, by surrounding the image by a blue frame Wblue (indicated by a bold dashed line in the drawing).

That is, the present main image and the next main image are made conspicuous using colors. It may not be possible to accurately recognize an image by simply using only a difference in color. However, it becomes easier for a user to perceive a correspondence between the color, the image, and the next main image by using the main image presentation unit 101 and the next presentation unit 102 in combination, and the main image and the next image are easily recognized using a difference in the color of a frame by getting used to it.

Meanwhile, it is desirable that the present main image be as conspicuous as possible, and thus, for example, the red frame Wred is appropriate.

On the lower side LS, an image type is expressed by the color of a frame. For example, a green frame Wgrn (indicated by a double line in the drawing) is applied for a captured image, and a black frame Wblk (indicated by a line with inclined lines in the drawing) is applied for a crop image.

Also in this case, it may not be possible to accurately recognize an image by simply using only a difference in color. However, it becomes easier for a user to perceive a correspondence between the color, the captured image, and the crop image by using the image type presentation unit 103 and the crop presentation unit 104 in combination, and the captured image and the crop image are easily recognized using a difference in the color of a frame by getting used to it.

Meanwhile, here, although the meaning of an image and a difference in type are represented by a difference in the color of a frame, this is not limited to the color of a frame, and the difference may be indicated by adopting various different display modes to be described later. For example, a display mode in which the type of frame line is different is also conceivable as illustrated in the drawing.

FIG. 14 illustrates an example in which, particularly, a region equivalent to an upper side US, that is, regions of images to be output as a main image MP and a next image MPN are not provided in the multi-view screen 100.

In the example illustrated in the drawing, a screen is divided into 9 parts, and a shot VD which is input as a switching target is displayed in each of the separate regions. Also in this case, the shots VD1, VD2, and VD3 captured by the imaging device 1 as the original captured images and the shots VD4, VD5, and VD6 as the crop images are displayed.

For each image, the type of image is presented by the image type presentation unit 103 and the crop presentation unit 104.

In addition, regarding a crop image, types of an automatic mode, a semi-automatic mode, and a manual mode are presented by the crop mode presentation unit 106.

In addition, for the shot VD2 which is set as a main image at present, the main image presentation unit 101 is provided, and "PGM" indicating a present main image is displayed. Further, for example, an image is made more conspicuous than other images by surrounding the image by a red frame Wred (indicated by a bold line in the drawing), so that it is clearly presented to a user that the image is a present main image.

For the shot VD4 which is set as a next main image, the next presentation unit 102 is provided, and "NEXT" indicating a next main image is displayed. Further, for example, an image may be made slightly more conspicuous than other images by surrounding the image by a blue frame Wblue (indicated by a bold dashed line in the drawing).

For example, as in this example, the multi-view screen 100 may be configured such that a list of shots input as switching targets is displayed, and among the shots, a main image and a next main image are clearly shown.

Meanwhile, the screen examples illustrated in FIGS. 12, 13, and 14 are just examples, and a configuration of the multi-view screen 100 and contents of display are not limited thereto. Various examples such as the number of shots to be displayed, the size of a frame of an image, and the display of an operator are assumed.

4. Crop Setting Screen

Next, the crop setting screen 200 will be described.

Figure 15:
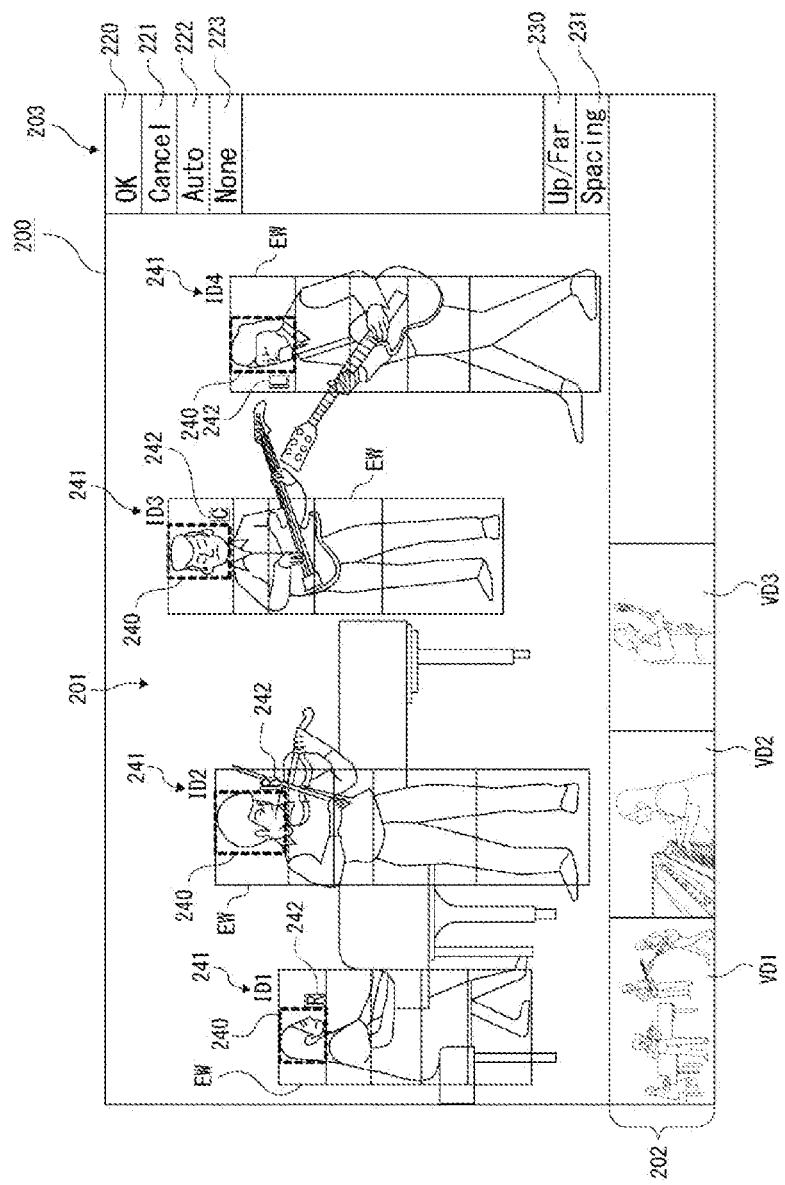
FIG. 15 is a diagram illustrating a crop setting screen in the embodiment.

FIG. 15 illustrates an example of the crop setting screen 200 which is displayed on the display unit 77 (or the display unit 15) under the control of the UI control unit 30. For example, the UI control unit 30 performs control for displaying the crop setting screen 200 in response to a user operating (clicking or the like) a region of a certain crop image in the multi-view screen 100.

The crop setting screen 200 is a screen for causing a user to operate a crop mode or operate a manual mode or a semi-automatic mode.

Meanwhile, various operations serving as a trigger of a transition from the multi-view screen 100 to the crop setting screen 200 are conceivable. A button display for giving an instruction for a transition to the crop setting screen 200 may be provided in the multi-view screen 100, or an operation of a specific mode may be performed in response to an instruction for a transition to the crop setting screen 200.

The crop setting screen 200 in FIG. 12 is roughly divided into a setting region 201, an image selection region 202, and an operation region 203 that are prepared.

In the setting region 201, for example, a shot VD as a certain one captured image is displayed. It is assumed that the shot VD4 in the multi-view screen 100 illustrated in FIG. 12 is an image which is cut out from the shot VD1.

In this case, the UI control unit 30 causes the shot VD1 which is the original captured image to be displayed in the setting region 201 of the crop setting screen 200 in accordance with the region of the shot VD4 in FIG. 12 being clicked or the like.

In the crop setting screen 200 as illustrated in FIG. 15, a candidate frame EW is displayed in an image shown in the setting region 201 on the basis of a subject recognition result obtained through image analysis. The candidate frame EW indicates a candidate for a subject to be cropped in a semi-automatic mode or an automatic mode.

In this example, the candidate frame EW roughly presents a region of a subject person within each image. Further, in the candidate frame EW, target regions as an up shot, a bust shot, a waist shot, a knee shot, a full-length shot, and the like are roughly separated by horizontal lines.

Meanwhile, in this example, the candidate frame EW does not indicate a crop region itself. The candidate frame EW indicates a candidate such as a subject person or the like which is cut out as a crop image. However, the candidate frame EW may indicate a crop region itself.

The candidate frame EW is set for each frame of a moving image in accordance with a subject recognition result obtained through image analysis. Thus, in a case where a moving image is displayed in the setting region 201, the position of the candidate frame EW also changes for each frame in accordance with the position of a subject.

In addition, a face recognition frame 240 is displayed in an image shown in the setting region 201. A face region of a subject person is indicated by the face recognition frame 240 on the basis of a face recognition result obtained through image analysis.

Further, in the image shown in the setting region 201, subject identification information 241 is displayed for a subject recognized as a result of subject recognition. For example, identification numbers such as "ID1", "ID2", . . . are displayed in the vicinity of a subject person.

Further, in the image shown in the setting region 201, face direction information 242 indicating the orientation of a face is displayed for a subject person recognized as a result of subject recognition. For example, any one of "R", "C", and "L" is displayed in the vicinity of a face of a subject person. The "R" indicates that a face is facing right, the "C" indicates that a face is facing the front, and the "L" indicates that a face is facing left.

The face direction information 242 presents a user a direction in which a space is formed when a so-called spacing mode is turned on.

A captured image on which crop setting can be performed is displayed in the image selection region 202 shown in the crop setting screen 200. Here, a state where shots VD1, VD2, and VD3 which are captured images are displayed is shown.

A user can select (click or the like) any image in the image selection region 202 to select a captured image which is a crop setting source, that is, an image to be displayed in the setting region 201.

Various operation buttons are displayed in the operation region 203 shown in the crop setting screen 200. Here, an OK button 220, a Cancel button 221, an Automatic button 222, a None button 223, an Up/Far mode button 230, and a Spacing mode button 231 are illustrated.

The OK button 220 is an operator for performing a termination operation by reflecting a user operating performed on the crop setting screen 200.

When a user performs various operations and then operates the OK button 220, the UI control unit 30 makes settings and the like based on the previous user operations valid to performs necessary setting changes and the like and then makes the display return to the multi-view screen 100.

The Cancel button 221 is an operator for performing a termination operation without reflecting a user operation performed on the crop setting screen 200.

When a user performs various operations and then operates the Cancel button 221, the UI control unit 30 makes settings and the like based on the previous user operations invalid to make the display return to the multi-view screen 100 without performing setting changes and the like.

The Automatic button 222 is an operator for causing a user to instruct an automatic mode for cropping processing.

In a case where a user has operated the Automatic button 222, the UI control unit 30 sets a shot VD as a crop image, which is the present processing target, to be in an automatic mode to make the display return to the multi-view screen 100. The shot VD as a crop image which is the present processing target is, for example, a shot VD on which a user has performed a designation operation such as clicking in order to make a transition to the crop setting screen 200 in the multi-view screen 100.

The None button 223 is an operator for giving an instruction for terminating cropping processing.

In a case where a user has operated the None button 223, the UI control unit 30 terminates the generation of a crop image from a shot VD as a captured image, which is the present processing target, to make the display return to the multi-view screen 100. The shot VD as a captured image which is the present processing target is, for example, a shot VD of an original captured image from which a shot VD, on which a user has performed a designation operation such as clicking in order to make the screen transition to the crop setting screen 200 in the multi-view screen 100, is cut out, that is, a shot VD displayed in the setting region 201.

The Up/Far mode button 230 is an operator for designating a zoom-in/zoom-out mode of an image.

For example, the UI control unit 30 switches a crop region of a crop image which is a crop setting target between the setting of zoom-in and the setting of zoom-out in response to a user operation performed on the Up/Far mode button 230. For example, switching between a face up shot and a full-length shot is performed. Meanwhile, an up shot, a bust shot, a waist shot, a knee shot, and a full-length shot may be sequentially switched.

The Spacing mode button 231 is an operator for performing switching between the turn-on and the turn-off of a spacing mode.

The UI control unit 30 switches setting regarding whether or not spacing is performed on a crop image which is a crop setting target in response to an operation of a spacing mode.

Meanwhile, although it will be illustrated later, "spacing" is making a space in a region equivalent to the front of a face in an image. For example, when a space is made on a right side by moving a face to the left in an image in a case where a face portion facing right is cut out, a good composition is obtained. A user can select whether to perform such spacing or not in a spacing mode.

The above-described example of the crop setting screen 200 is an example, and it is needless to say that various other display examples are assumed.

In addition, it may be possible to perform operations, such as preparing an interface or the like allowing an aspect ratio of a crop image to be selected, other than the above-described operation.

5. Crop Setting Processing

Hereinafter, crop setting using the crop setting screen 200 will be described. First, crop setting in a manual mode will be described. The manual mode is a mode in which a user sets the designation of the range of a crop region on the setting region 201. The manual mode is preferably used particularly in a case where a user desires to arbitrarily set a crop region, such as a case where a subject cannot be recognized by image analysis, a case where a subject does not move, or a case where there is little action or movement of a subject. The crop region which is set in the manual mode is a fixed region (does not change for each frame).

A user performs an operation of selecting a certain shot VD (clicking, tapping, double clicking, double tapping, or the like) on the multi-view screen 100, and thus the UI control unit 30 makes display to transition from the multi-view screen 100 to the crop setting screen 200.

The user performs an operation of selecting a region desired to be cut out on the setting region 201 of the crop setting screen 200. For example, the user performs an operation of designating rectangular upper left and upper right coordinates.

Figure 16:
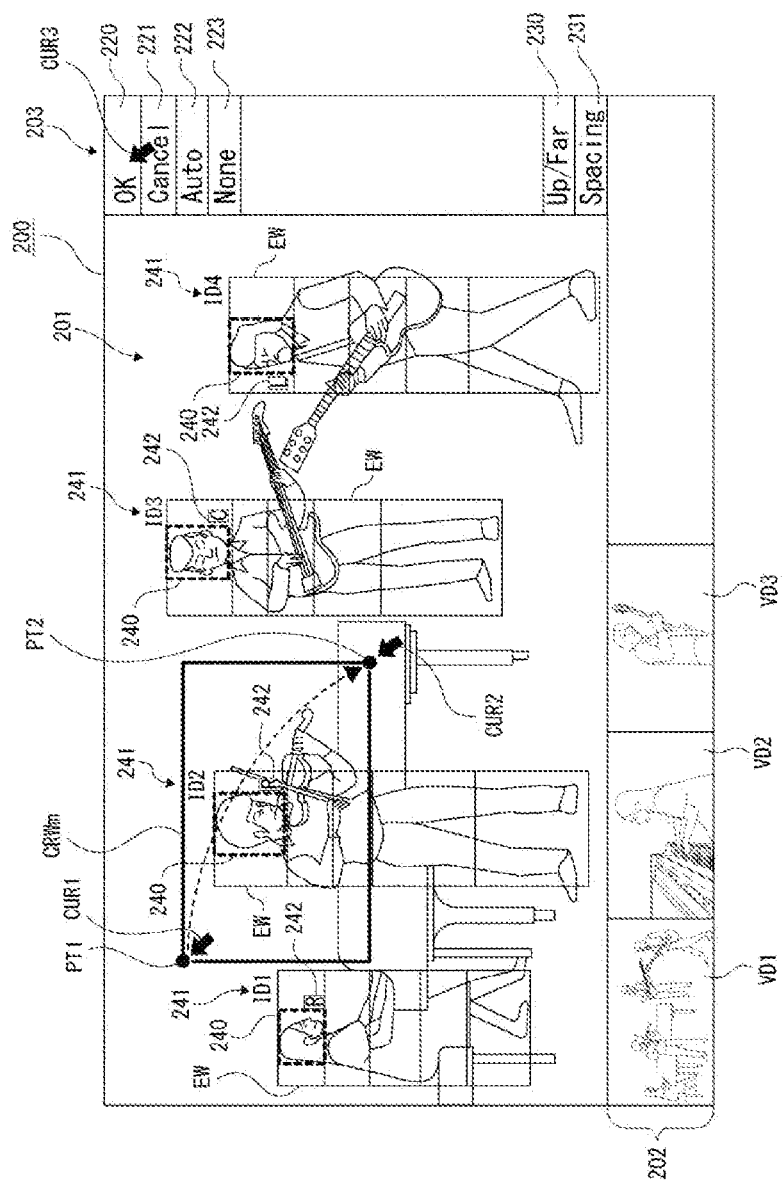
FIG. 16 is a diagram illustrating a manual mode operation in the embodiment.

In FIG. 16, for example, a user designates a position PT1 by moving a cursor on a screen so as to indicate the cursor as a cursor CUR1 and performing clicking or the like. Subsequently, the user moves the cursor by a drag operation. At this time, a crop frame CRWm changes depending on a drag operation (a rectangular range is enlarged/reduced). In a case where the user moves the cursor so as to indicate the cursor as a cursor CUR2 by, for example, a drag operation and designates a position PT2, the crop frame CRWm illustrated in the drawing indicates a crop region designated by the user.

Thereafter, in a case where the user operates the OK button as indicated as a cursor CUR3, the UI control unit 30 thereafter performs control on a shot VD which is a setting target so that cropping processing is performed in a crop region equivalent to the crop frame CRWm illustrated in the drawing, and makes the display return to the multi-view screen 100.

Meanwhile, for example, in the case of such a manual operation, the first position PT1 is designated as a position which is not included in the candidate frame EW, and thus the UI control unit 30 can recognize the designation as a position designation operation for starting a manual operation. In a case where designation in the candidate frame EW is set to be an operation in a semi-automatic mode to be described later, the user can distinguish whether the user attempts to perform a manual operation on the basis of the first designated position or whether the user has performed subject designation based on a semi-automatic mode. Alternatively, a drag operation is performed from the first coordinate designation regardless of positions inside and outside the candidate frame EW, and thus the UI control unit 30 may recognize that a manual operation is being performed and make a distinction from subject designation in a semi-automatic mode to be described later.

The UI control unit 30 performs these identifications, and thus the user does not need to specially perform an additional operation for distinguishment between a manual mode and a semi-automatic mode on the crop setting screen 200, and the user can suddenly perform an operation in a manual mode or perform a subject designation operation in a semi-automatic mode to be described later.

Meanwhile, in the case of an operation in a manual mode, it may not be appropriate to cause a user to set a crop region completely freely.

For example, in a case where a region having an extremely narrow range on the setting region 201 is designated, a crop image may be a significantly enlarged image, thereby reducing the resolution and degrading the image quality.

Consequently, the user's operation is restricted.

Figure 17:
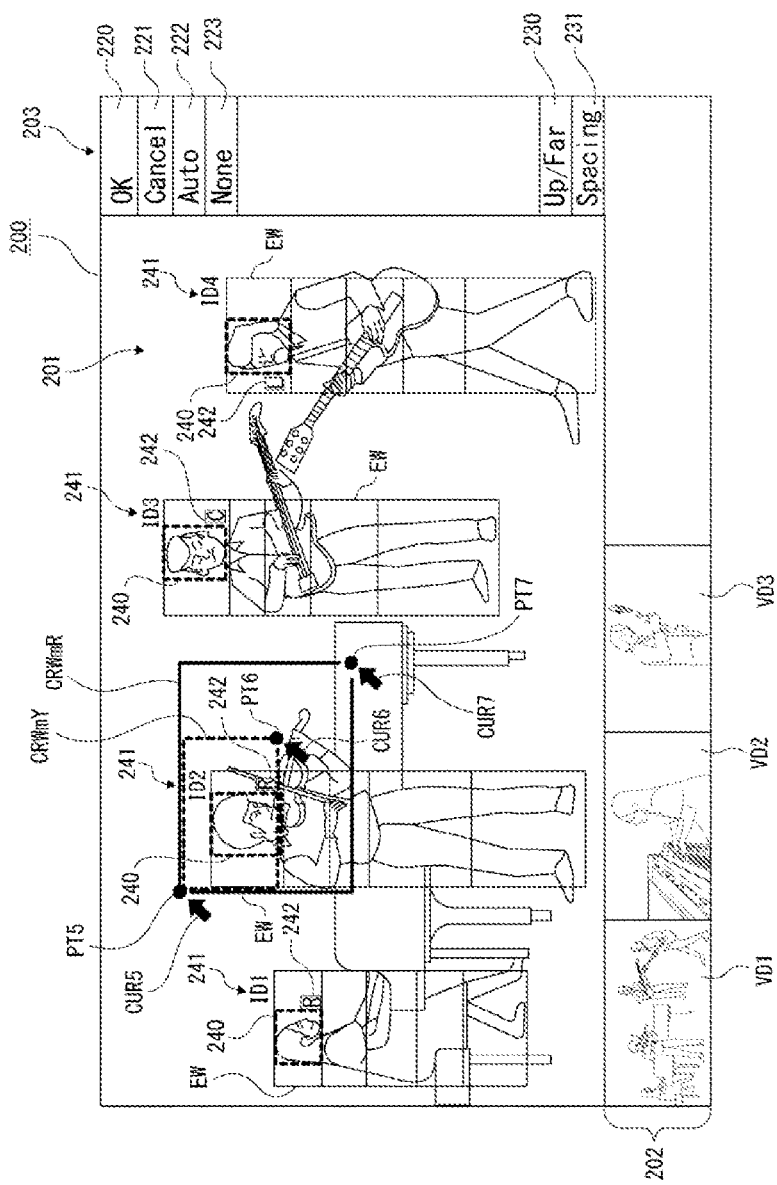
FIG. 17 is a diagram illustrating display according to resolution conditions in a manual mode in the embodiment.

FIG. 17 illustrates a process in which a user performs a drag operation similar to FIG. 16. A crop frame CRWmY indicated by a dashed line is assumed to be a yellow frame display, and a crop frame CRWmR indicated by a solid line is assumed to be a red frame display.

For example, it is assumed that the user designates a position PT5 as indicated by a cursor CUR5 and then performs a drag operation. In a state where an operation has progressed to a cursor CUR6, a yellow frame is displayed as the crop frame CRWmY, which indicates to a user that cropping processing with the size is prohibited.

Thereafter, when a region to be designated has a certain degree of area or a greater area, the frame thereof becomes red like the crop frame CRWmR. This means that a user is presented that the region of the crop frame CRWmR can be set as a crop region.

For example, in this manner, a user (operator) can perform crop setting based on an appropriate image quality state according to a manual mode by changing the color of the crop frame CRWm according to whether or not a minimum resolution is secured and making the user know whether or not setting can be performed. In other words, even when an operation in a manual mode can be performed, it is possible to prevent the image quality of a crop image to be used for broadcasting or the like from being degraded.

Meanwhile, it is not limited to changing the color of the crop frame CRWm. For example, in a case where a resolution condition is not secured, "setting is impossible" or the like is displayed as a text display, and "OK" or the like may be displayed in a state where a resolution condition is secured.

Naturally, it may be indicated whether setting is impossible or allowed according to other display modes, regardless of colors or characters.

Incidentally, in the examples illustrated in FIG. 16 and FIG. 17, two points (two sets of coordinates), that is, upper left and lower right points are designated by a user as designation of a crop region, but various operation methods for designation are conceivable.

Figure 18:
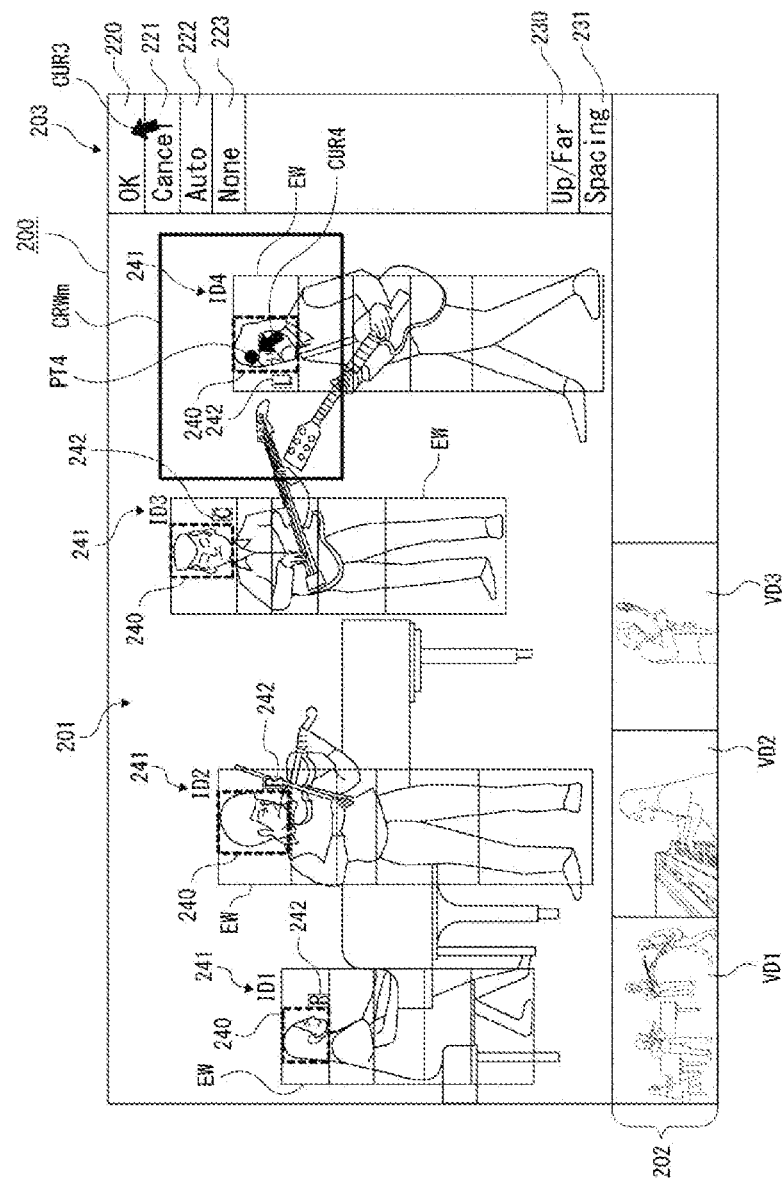
FIG. 18 is a diagram illustrating another example of a manual mode operation in the embodiment.

For example, FIG. 18 illustrates an example in which a user designates one set of coordinates on a screen.

It is assumed that the user has performed an operation of designating a position PT4 at a position indicated by a cursor CUR4. The UI control unit 30 calculates a crop region in response to the operation to display a crop frame CRWm. For example, the UI control unit 30 calculates a crop region centering on the designated coordinates. Alternatively, for example, it is also conceivable to calculate a crop region so that the designated coordinates are positioned on the upper left side. When the user operates the OK button 220 so as to display a cursor CUR3 after the crop frame CRWm is displayed in accordance with one coordinate point of the user in this manner, the UI control unit 30 thereafter performs control so that cropping processing is performed in a crop region equivalent to the crop frame CRWm illustrated in the drawing with respect to a shot VD which is a setting target, and makes the display return to the multi-view screen 100.

For example, in this manner, a manual mode can be set by designating at least one set of coordinates.

Naturally, there are various other operation examples. For example, in a case where two points are designated as illustrated in FIG. 16, upper left coordinates may be first designated, and then lower right coordinates may be designated instead of performing a drag operation. Naturally, upper right coordinates and lower left coordinates may be designated.

A crop region may be set by an operation of tracing the vicinity of the crop region (an operation of drawing a frame).

In any case, a crop region may be set by a user designating one or more sets of coordinates.

Subsequently, crop setting in a semi-automatic mode will be described. The semi-automatic mode is a mode in which a crop region is set in accordance with a user's subject designation on the setting region 201. The semi-automatic mode is suitable for the generation of a crop image of, for example, a specific person or the like as a main subject or the like, and a crop region is automatically followed even in a case where there is an action of the subject (a large action). That is, a crop region fluctuates to be appropriate for a designated subject for each frame.

A user performs an operation of selecting a certain shot VD (clicking, tapping, double clicking, double tapping, or the like) on the multi-view screen 100, and thus the UI control unit 30 makes display to transition from the multi-view screen 100 to the crop setting screen 200.

The user selects a subject indicated by a candidate frame EW on the setting region 201 of the crop setting screen 200.

Figure 19:
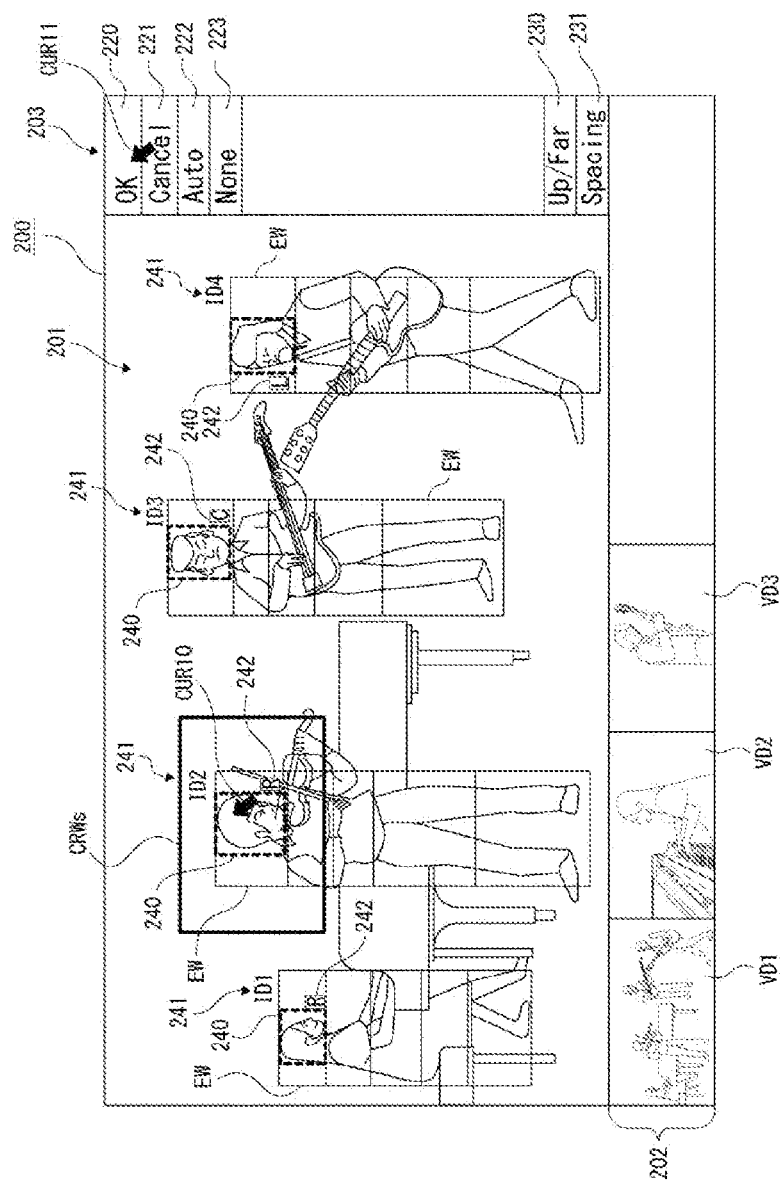
FIG. 19 is a diagram illustrating a semi-automatic mode operation in the embodiment.

For example, FIG. 19 illustrates an example in which a subject is designated by positioning a cursor CUR10 on the inner side of the candidate frame EW displayed for a certain subject person and performing a click operation or the like.

Meanwhile, in this example, it is assumed that a relevant subject is selected even when any position within the candidate frame EW is designated. That is, in the example, even in the case of a position within the candidate frame EW, for example, a face portion of a subject person or a portion near a waist, it is assumed that there is no difference between operations thereof, and the subject is simply designated.

When a user performs an operation of designating a subject in this manner, the UI control unit 30 calculates a crop region for cutting out the subject in response to the operation and displays a crop frame CRWs. For example, the UI control unit 30 calculates a crop region centering on a face region with respect to a designated subject. Naturally, the UI control unit 30 can also calculate a crop region including a full length with respect to a designated subject.

In addition, the UI control unit 30 presents the calculated crop region to a user using the crop frame CRWs.

When the user operates the OK button 220 as indicated as a cursor CUR11 after the crop frame CRWs is displayed in accordance with the user's subject designation, the UI control unit 30 thereafter performs control so that cropping processing is performed in a crop region targeted at the designated subject with respect to a shot VD which is a setting target, and makes the display return to the multi-view screen 100.

Regarding cropping processing in this case, a crop region is calculated for each frame by processing for tracking an action of the designated subject. Thus, even when the user does not perform fine designation, for example, a shot VD of a crop image in which the face of a designated subject is positioned at the center is obtained at all times.

Incidentally, the calculation of a crop region based on the subject designation is performed in response to the turn-on/turn-off of a spacing mode according to an operation of the Spacing mode button 231 or an operation of the Up/Far mode button 230.

Figure 20A:
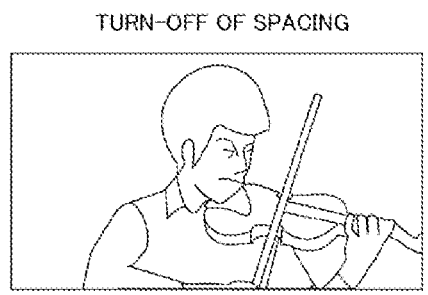
FIGS. 20A and 20B are diagrams illustrating a crop region according to a spacing mode in the embodiment.
Figure 20B:
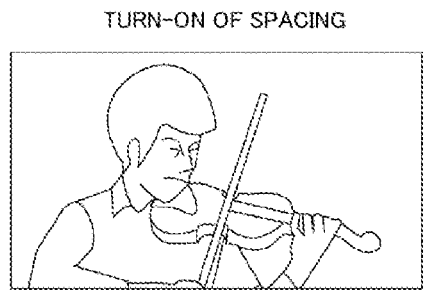

FIG. 20A illustrates a crop image in a case where a spacing mode is turned off, and FIG. 20B illustrates a crop image in a case where a spacing mode is turned on.

As described above, "spacing" is making a space in a region equivalent to the front of a face in an image, and a well-balanced image can be obtained by making a space on a right side in a case where the face faces right and making a space on a left side in a case where the face faces left.

When a spacing mode is turned off, for example, the face is set to be positioned at the center as illustrated in FIG. 20A. That is, the UI control unit 30 calculates a crop region so that a face region of the designated subject is positioned at the center. When a spacing mode is turned on, for example, the face is set to be positioned to be deviated from the center as illustrated in FIG. 20B. That is, the UI control unit 30 calculates a crop region so that the position of the face is shifted, in accordance with the orientation of the face of the designated subject. In a case where the face is facing right as illustrated in the drawing, a crop region is calculated such that a space is made on a right side by the face being moved to the left within an image. Although not illustrated in the drawing, when the face is facing left, a crop region is calculated such that a space is made on a left side by the face being moved to the right within an image.

In a case where the face is facing the front, the UI control unit 30 is not limited to the turn-on/turn-off of a spacing mode, and a crop region is calculated such that the face is disposed at the center of an image.

In this manner, in a semi-automatic mode, a user can arbitrarily select whether to perform spacing or not in a crop image.

Meanwhile, it is conceivable that the turn-on/turn-off of a spacing mode is also applied in an automatic mode. That is, also when a subject is automatically specified in an automatic mode and a crop region is automatically calculated, an operation of turning on/turning off a spacing mode in the crop setting screen 200 is reflected.

In addition, the UI control unit 30 makes the calculation of a crop region different according to an operation of the Up/Far mode button 230.

For example, "Up" is selected in an initial state. Further, in a case where "Up" (zoom-in) is selected, the UI control unit 30 calculates a crop region such that a face is positioned at the center and is shown large within an image.

Whether a crop image is set to be a "zoom-in" image or a "zoom-out" image is switched by an operation of the Up/Far mode button 230. Further, in a case where "Far" (zoom-out) is selected, the UI control unit 30 calculates a crop region such that, for example, the full-length of a subject person is included, and for example, a full length is included in an image with the vicinity of the waist of the subject person, or the like at the center.

In this manner, in a semi-automatic mode, a user can arbitrarily select the setting of zoom-in or zoom-out in a crop image.

Meanwhile, as described above, for example, an up shot, a bust shot, a waist shot, a knee shot, or a full-length shot can be selected by the Up/Far mode button 230 or the like, and accordingly, it is also assumed that the UI control unit 30 calculates a crop region.

In addition, it is also conceivable that the setting of zoom-in or zoom-out, or the setting of an up shot, a bust shot, a waist shot, a knee shot, or a full-length shot is applied in an automatic mode. That is, also when a subject is automatically specified in an automatic mode and a crop region is automatically calculated, an operation of the Up/Far mode button 230 of the crop setting screen 200 is reflected. In addition, a sun-flag composition, the rule of thirds, or the like may be set to be selectable.

The above-described spacing mode and zoom-in/zoom-out mode (also referred to as a composition mode) may be configured to be set in more detail.

Figure 21:
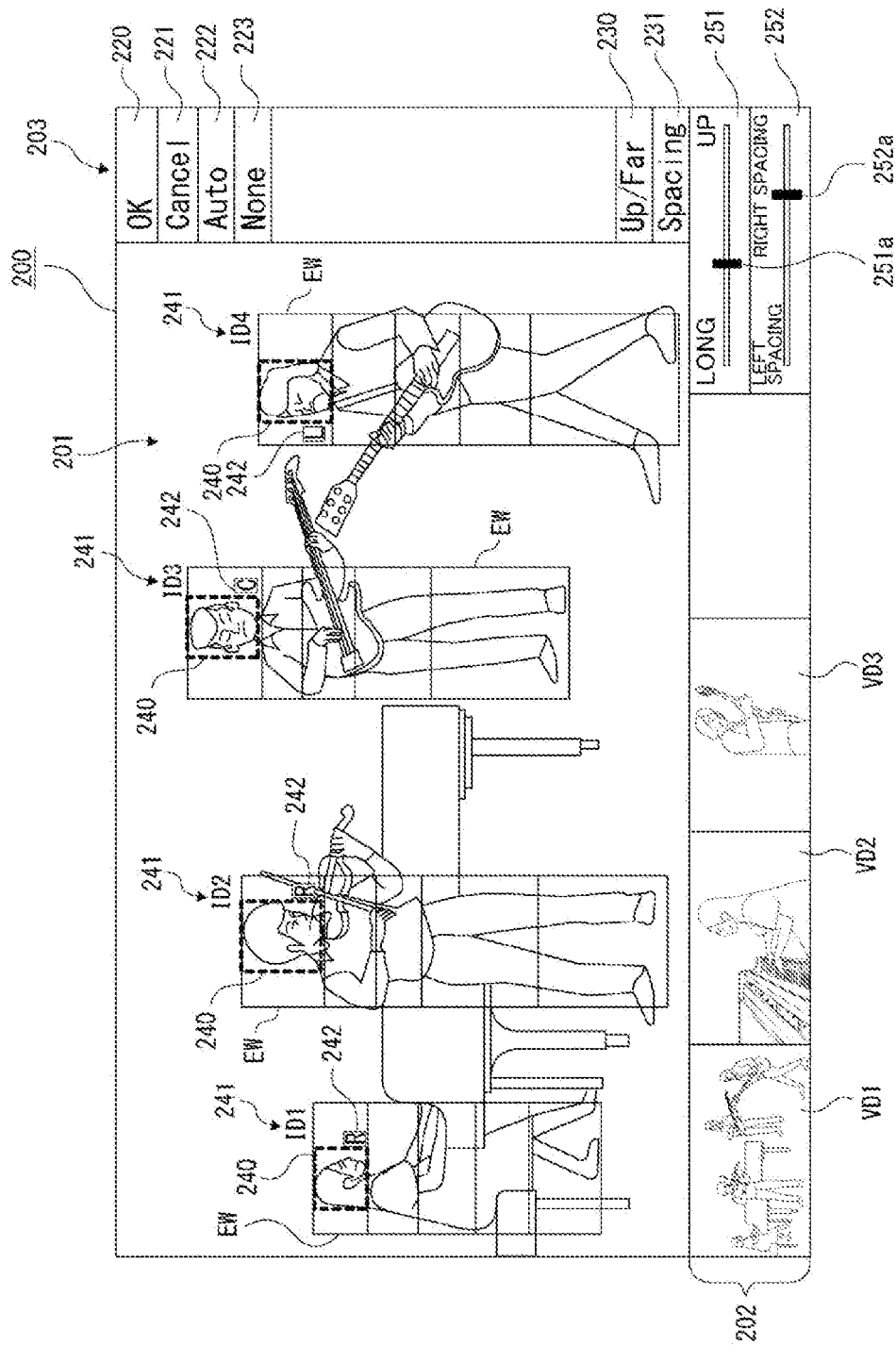
FIG. 21 is a diagram illustrating an example in which the amount of spacing can be adjusted in the embodiment.

For example, FIG. 21 illustrates an example in which a zoom bar 251 and a spacing bar 252 are displayed in the crop setting screen 200.

A user can perform designation by continuously changing the degree of zoom-in (up) and zoom-out (long) by the zoom bar 251. For example, a zoom position is designated by sliding a knob 251*a* of the zoom bar 251. The UI control unit 30 performs the calculation of a crop region in a semi-automatic mode or an automatic mode so as to correspond to the designated zoom position, in accordance with an operation of the zoom bar 251.

In addition, the user can perform designation by continuously changing the amount of spacing and a spacing direction using the spacing bar 252. For example, the amount of spacing on a left side in an image and the amount of spacing on a right side in the image are designated by sliding the knob 252*a* of the spacing bar 252. The UI control unit 30 reflects the calculation of a crop region in a semi-automatic mode or an automatic mode in the designated amount and direction of spacing in accordance with an operation of the spacing bar 252.

In addition, it is also conceivable to adopt an example in which the selection of an up shot, a bust shot, a waist shot, a knee shot, or a full-length as a composition is performed according to a designated position (for example, a clicked position) for a candidate frame EW.

Figure 22A:
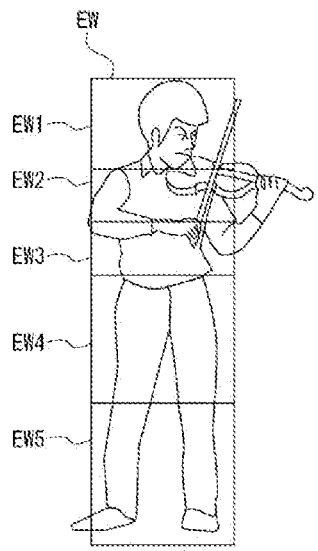
FIGS. 22A and 22B are diagrams illustrating composition designation using a candidate frame in the embodiment.
Figure 22B:
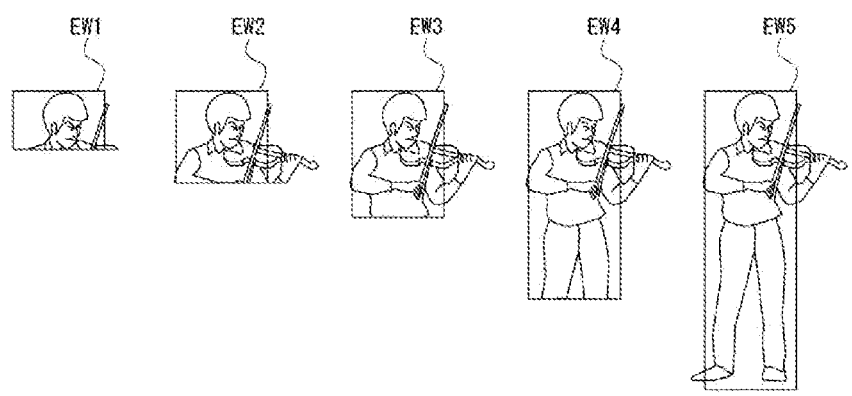

FIG. 22A illustrates a candidate frame EW for a subject person. However, as illustrated in the drawing, it is conceivable that one candidate frame EW is displayed such that a candidate frame EW1 corresponding to an up shot, a candidate frame EW2 corresponding to a bust shot, a candidate frame EW3 corresponding to a waist shot, a candidate frame EW4 corresponding to a knee shot, and a candidate frame EW5 corresponding to a full-length shot overlap each other. FIG. 22B illustrates the candidate frames EW1, EW2, EW3, EW4, and EW5 that do not overlap each other.

Here, a user designates any one of the candidate frames EW1, EW2, EW3, EW4, and EW5 so that subject designation and composition designation of zoom-in/zoom-out are performed at the same time.

Figure 23:
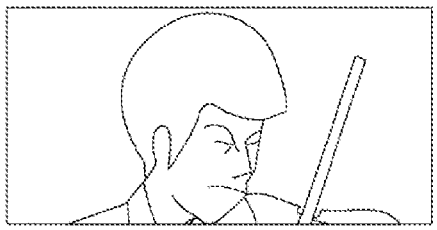
FIG. 23 is a diagram illustrating the composition of a crop image using a candidate frame in the embodiment.
Figure 23:
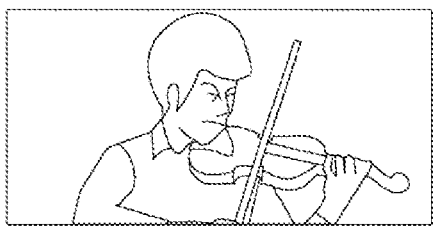
Figure 23:
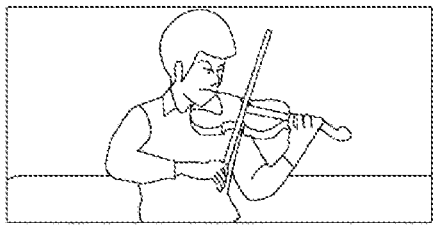
Figure 23:
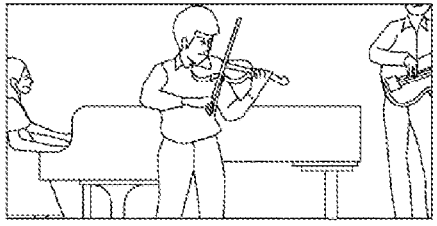
Figure 23:
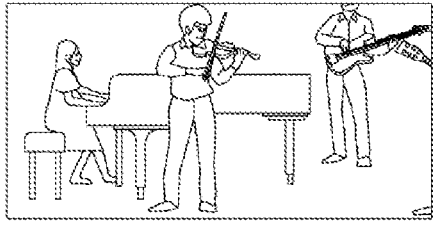

For example, in a case where the user designates the portion of the candidate frame EW1, a crop region is calculated such that an up shot of the face of the designated subject is obtained, as indicated as an image of EW1 designation in FIG. 23. Similarly, in a case where the user designates the portion of the candidate frame EW2, a crop region is calculated such that a bust shot of the designated subject is obtained, as indicated as an image of EW2 designation in FIG. 23.

In a case where the user designates the portion of the candidate frame EW3, a crop region is calculated such that a waist shot of the designated subject is obtained, as indicated as an image of EW3 designation.

In a case where the user designates the portion of the candidate frame EW4, a crop region is calculated such that a knee shot of the designated subject is obtained, as indicated as an image of EW4 designation.

In a case where the user designates the portion of the candidate frame EW5, a crop region is calculated such that a full-length shot of the designated subject is obtained, as indicated as an image of EW5 designation.

In this manner, an operation of the Up/Far mode button 230 is not necessary, and the setting of a composition can be performed at the same time with only an operation of subject designation.

Meanwhile, as can be seen from FIGS. 22A, 22B, and 23, the candidate frames EW1, EW2, EW3, EW4, and EW5 do not show crop regions as they are. For example, ranges in a vertical direction which are cut out as an up shot, a bust shot, a waist shot, a knee shot, and a full-length shot on a subject are roughly shown, and the shots have a common size in a width direction (for example, the size of a shoulder width of a subject person).

This is because, for example, when a crop region is displayed as it is at the time of showing a candidate frame EW for a plurality of subjects as illustrated in FIG. 15, a screen becomes too complicated, and the candidate frames EW of the subjects overlap each other to make it difficult to recognize them. The candidate frame EW is displayed with a width ignoring the size in the horizontal direction, and thus the crop setting screen 200 can be configured as an easy-to-understand screen.

For example, as described above, in a semi-automatic mode, an operation of subject designation, operations of an Up/Far mode and a spacing mode, and the like are performed.

Naturally, there are various other operation examples. For example, as described above, a subject is designated using the candidate frame EW, but an example in which the candidate frame EW is not displayed is also adopted.

Figure 24:
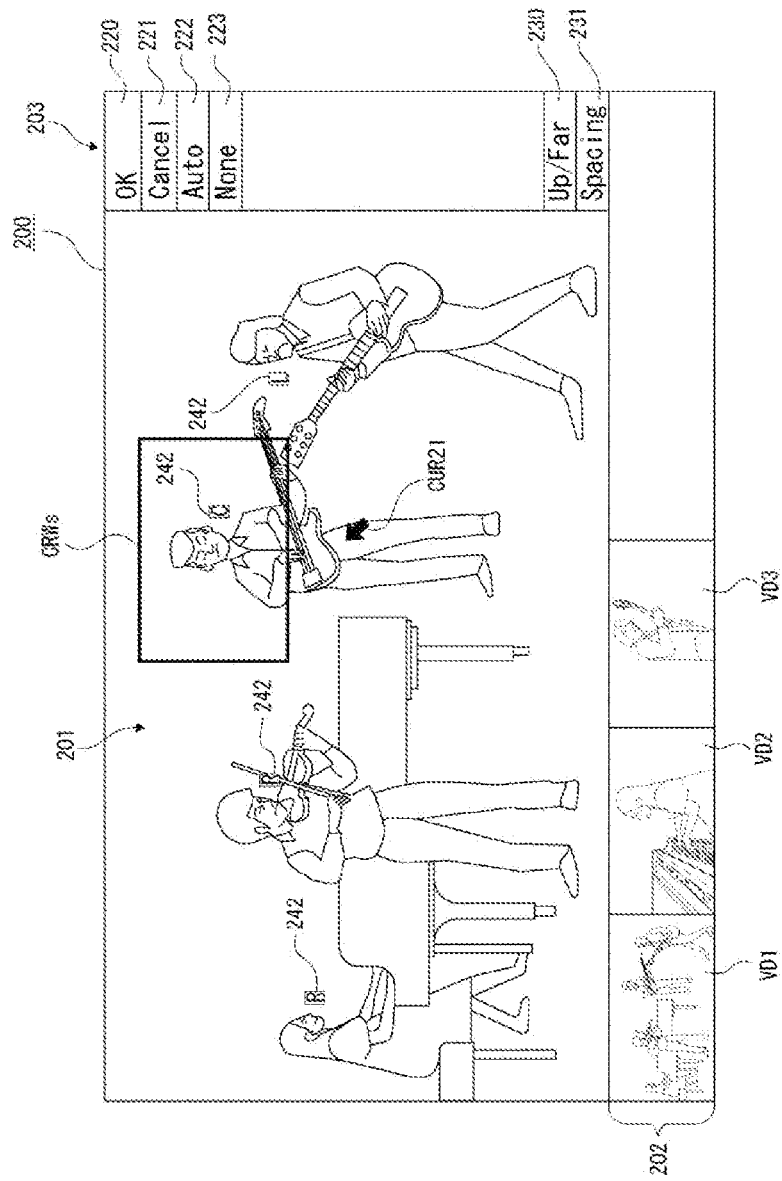
FIG. 24 is a diagram illustrating an example in which a candidate frame is not displayed in the embodiment.

For example, FIG. 24 illustrates an example in which the candidate frame EW is not displayed in the crop setting screen 200. For example, a user performs an operation of designating a portion (for example, a cursor CUR21) of a subject person. In a case where an image of a subject person is present at coordinates where a user has performed clicking or the like, the UI control unit 30 recognizes it as a subject designation operation, performs the calculation of a crop region according to a subject, and displays a crop frame CRWs indicating the calculated crop region.

In this manner, it is possible to perform a subject designation operation without using a candidate frame EW. However, the user easily recognizes a position where a subject designation operation is performed by displaying the candidate frame EW, and it is also possible to increase the accuracy of operation recognition of the UI control unit 30.

In the crop setting screen 200, the crop frame CRWs is displayed in accordance with a user selecting a subject (candidate frame EW) as illustrated in FIG. 19, but it is also conceivable that designation is cancelled by clicking or the like the subject (candidate frame EW) again.

In addition, it is also possible to perform an operation of registering a subject to be cut out in advance and selecting the subject. For example, a subject that can be selected as a face image is presented, and the user designates a subject person from the face image. The UI control unit 30 specifies the designated subject within an image by image analysis (face identification) and calculates a crop region for cutting out the subject.

The designated subject is at an edge of an image frame or the like, and a crop region in which the subject is disposed at the center or the like may not be able to be generated. In such a case, it is also conceivable to present a user that the selection of a subject is prohibited, by changing the color of the subject, or the like.

In addition, various subject selection operations such as the selection of an icon, the setting of operation contents based on an operation time (long press or the like), and setting based on a touch operation, a tap operation, or the like are conceivable.

In addition, subject designation using a sound may be performed. For example, a user's support is collected by a microphone and recognized, and a designated subject is recognized. For example, the calculation of a crop region based on the designation is performed in accordance with a sound such as "a bust shot while zooming a female who is a leading role".

Subsequently, crop setting in an automatic mode will be described. The automatic mode is a mode in which subject recognition and crop region setting are automatically performed without going through the user's designation operation. The automatic mode is suitable for a case where there is no difference in the importance of a subject and a case where the importance changes dynamically. In the case of an automatic mode, a subject is specified by image analysis, and the calculation of a crop region is performed so that a crop image of the subject is obtained. Also in a case where there is an action of a subject (an action is large), a crop region is automatically followed.

In a case where an automatic mode is selected, a user operates the Automatic button 222 in a state where a transition from the multi-view screen 100 to the crop setting screen 200 is made. Thereby, the UI control unit 30 sets a shot VD, which is a target for crop setting processing, to be in an automatic mode, and thereafter a crop image is generated in an automatic mode.

In the automatic mode, it is preferable to generate a crop region so that variations in an image capable of being selected by a user in the multi-view screen 100 increase.

For example, it is conceivable that
important subject: minor role is set to be 3:1
a crop image of an additional important subject is generated on the basis of a size (zoom-in or zoom-out), and
a variation is made to the number of subjects (one person, two persons, or the like) within an image.

Figure 25:
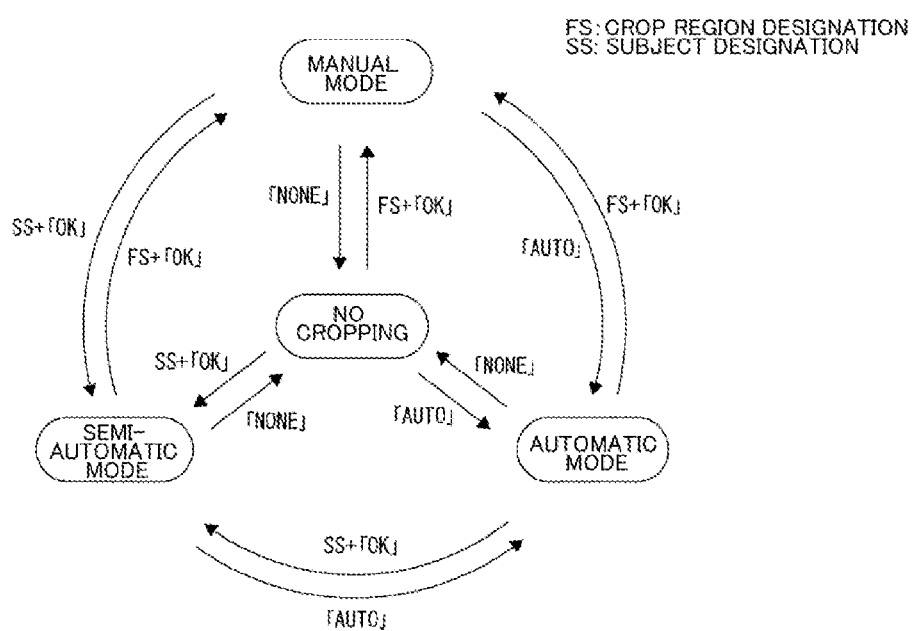
FIG. 25 is a diagram illustrating a mode transition of crop setting in the embodiment.

Although operations related to a manual mode, a semi-automatic mode, and an automatic mode have been described above, transitions between the modes are illustrated in FIG. 25.

This is a mode transition based on operations in the multi-view screen 100 and the crop setting screen 200. In the drawing, it is assumed that "FS" indicates a crop region designation operation as a manual operation in the crop setting screen 200, and "SS" indicates a subject designation operation in the crop setting screen 200. "OK" indicates an operation of the OK button 220, "AUTO" indicates an operation of the Automatic button 222, and "NONE" indicates an operation (crop termination instruction) of the None button 223.

When a certain crop image is in a manual mode at present, the crop image transitions to a target crop setting screen 200, and when the subject designation operation SS and an operation of the OK button 220 are performed, cropping processing is performed on the crop image in a semi-automatic mode.

When a certain crop image is in a manual mode at present, the crop image transitions to a target crop setting screen 200, and when an operation of the Automatic button 222 is performed, cropping processing is performed on the crop image in an automatic mode.

When a certain crop image is in a manual mode at present, the crop image transitions to a target crop setting screen 200, and when an operation of the None button 223 is performed, cropping processing related to the crop image is terminated.

When a certain crop image is in a semi-automatic mode at present, the crop image transitions to a target crop setting screen 200, and when the crop region designation operation FS and an operation of the OK button 220 are performed, cropping processing is performed on the crop image in a manual mode.

When a certain crop image is in a semi-automatic mode at present, the crop image transitions to a target crop setting screen 200, and when an operation of the Automatic button 222 is performed, cropping processing is performed on the crop image in an automatic mode.

When a certain crop image is in a semi-automatic mode at present, the crop image transitions to a target crop setting screen 200, and when an operation of the None button 223 is performed, cropping processing related to the crop image is terminated.

When a certain crop image is in an automatic mode at present, the crop image transitions to a target crop setting screen 200, and the crop region designation operation FS and an operation of the OK button 220 are performed, cropping processing is performed on the crop image in a manual mode.

When a certain crop image is in an automatic mode at present, the crop image transitions to a target crop setting screen 200, and when the subject designation operation SS and an operation of the OK button 220 are performed, cropping processing is performed on the crop image in a semi-automatic mode.

When a certain crop image is in an automatic mode at present, the crop image transitions to a target crop setting screen 200, and when an operation of the None button 223 is performed, cropping processing related to the crop image is terminated.

When the crop region designation operation FS and an operation of the OK button 220 are performed in the crop setting screen 200 in a state where a crop image is not designated or a state where cropping processing is not performed, cropping processing is started in a manual mode for a crop region thereof.

When the subject designation operation SS and an operation of the OK button 220 are performed in the crop setting screen 200 in a state where a crop image is not designated or a state where cropping processing is not performed, cropping processing in a semi-automatic mode based on the subject designation is started. When an operation of the Automatic button 222 is performed in the crop setting screen 200 in a state where a crop image is not designated or a state where cropping processing is not performed, cropping processing in an automatic mode is started.

A specific example of crop setting processing accompanying the above-described operation transition will be described using the multi-view screen 100 and the crop setting screen 200 that have been described so far.

A processing example to be described below will be described on the assumption that processing is performed mainly by the function of the UI control unit 30, for example, in the CPU 71 of FIG. 7 which has the function illustrated in FIG. 8. That is, an example in which the image processing device is realized in the portable terminal 2, the computer device 5, the switcher 3, the cloud switcher 4, and the like is illustrated as in FIGS. 1, 2, 3, and 4. Meanwhile, in a case where the image processing device of the present embodiment is built in the imaging device 1 as illustrated in FIG. 5, it is only required that the following processing is performed by the camera signal processing unit 13 or the camera control unit 18 illustrated in FIG. 6.

Figure 26:
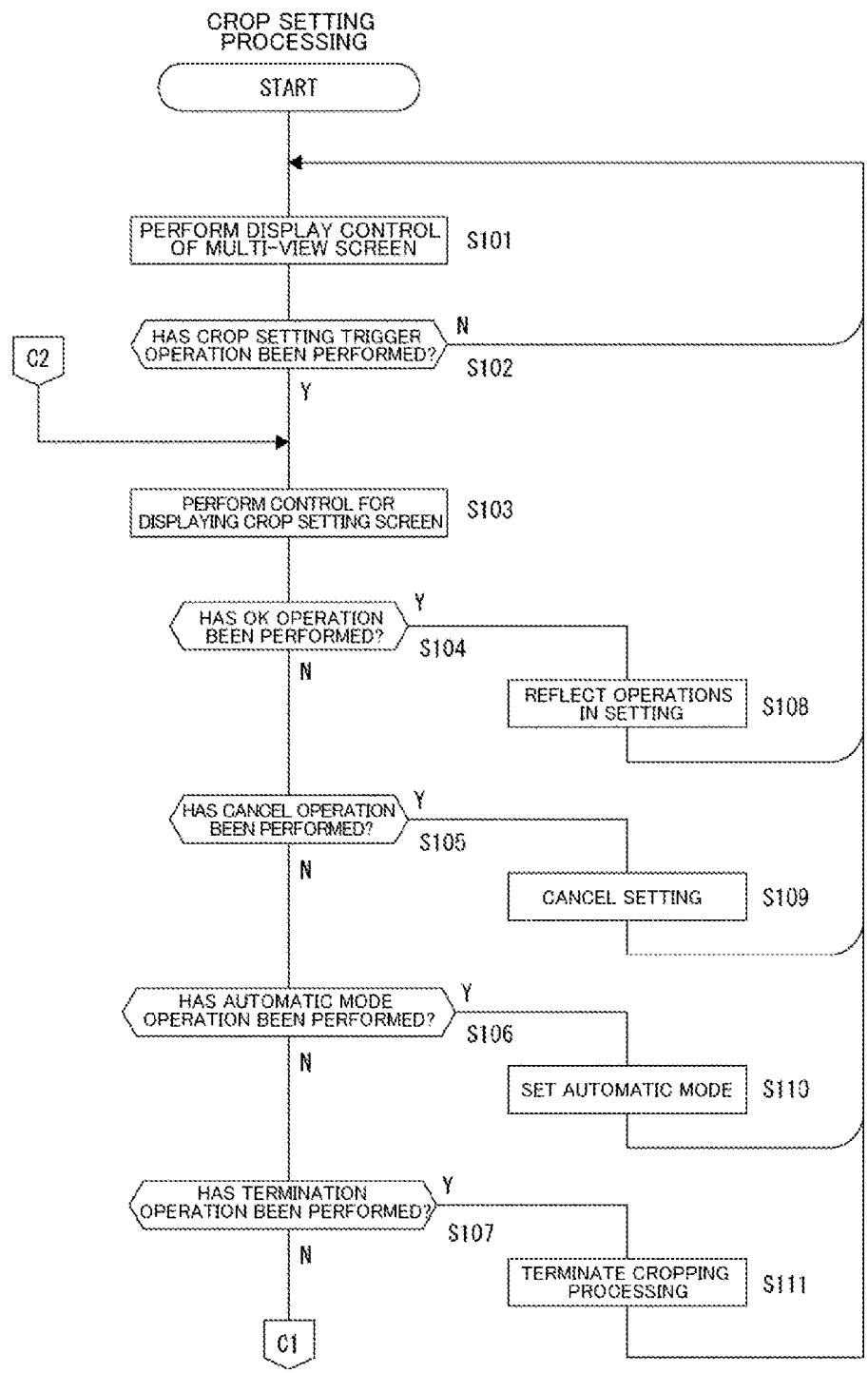
FIG. 26 is a flowchart of crop setting processing in the embodiment.
Figure 27:
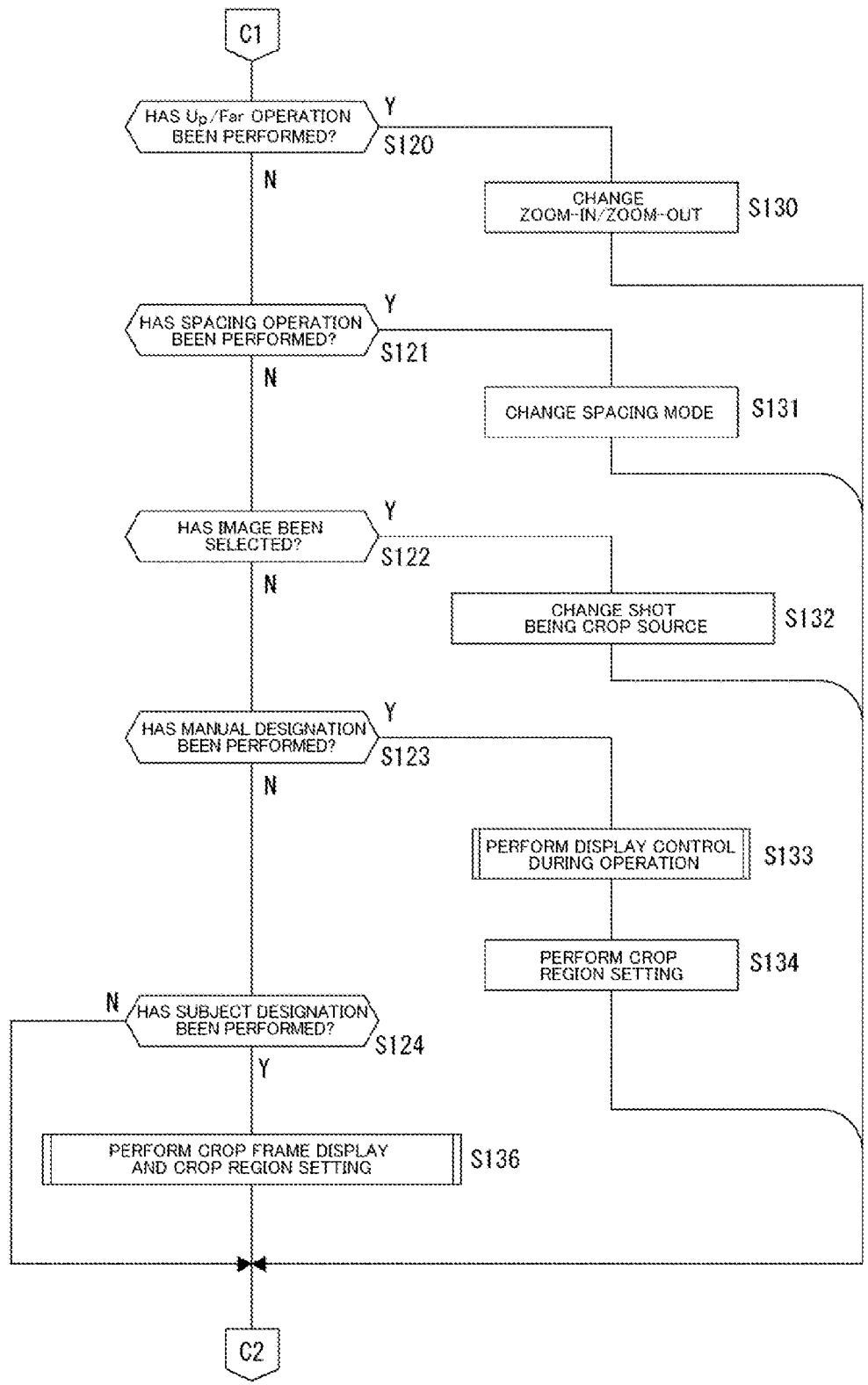
FIG. 27 is a flowchart of crop setting processing in the embodiment.

FIGS. 26 and 27 illustrate crop setting processing performed by the CPU 71 (mainly the UI control unit 30). Meanwhile, it is assumed that flowcharts in FIGS. 26 and 27 are continuous at portions indicated by signs "C1" and "C2".

Step S101 shows processing in which the CPU 71 performs display control of the multi-view screen 100.

In step S102, the CPU 71 monitors whether or not a user has performed a crop setting trigger operation in the multi-view screen 100. The crop setting trigger operation mentioned herein is an operation of clicking a certain crop image to request a transition to the crop setting screen 200.

Meanwhile, in FIG. 26, crop setting processing is described, and other operations in the multi-view screen 100 are not illustrated and described.

When a user's crop setting trigger operation is detected, the CPU 71 proceeds to step S103 to perform control for displaying the crop setting screen 200.

In a state where the crop setting screen 200 is displayed, the CPU 71 monitors an OK operation in step S104, a cancel operation in step S105, an automatic mode operation in step S106, and a termination operation in step S107.

In addition, the CPU 71 monitors an Up/Far mode operation in step S120 of FIG. 27, a spacing mode operation in step S121, an image selection operation in step S122, a manual designation (crop region designation) operation in step S123, and a subject designation operation in step S124.

The OK operation monitored in step S104 is an operation of the OK button 220.

In a case where the OK button 220 is operated, the CPU 71 proceeds from step S104 to step S108, validates the previous operations (for example, a crop region designation operation based on a manual operation and subject designation for a semi-automatic mode), and reflects the operations in setting. Thereby, the change of a crop mode, the change of a crop region, and the like are performed. Then, the CPU 71 returns to step S101 to display the multi-view screen 100.

The cancel operation monitored in step S105 is an operation of the Cancel button 221.

In a case where the Cancel button 221 is operated, the CPU 71 proceeds from step S105 to step S109, invalidates the previous operations (for example, a crop region designation operation based on a manual operation and subject designation for a semi-automatic mode), and does not change setting. Then, the CPU 71 returns to step S101 to display the multi-view screen 100.

The automatic mode operation monitored in step S106 is an operation of the Automatic button 222.

In a case where the Automatic button 222 is operated, the CPU 71 proceeds from step S106 to step S110 to change a crop mode to an automatic mode. Then, the CPU 71 returns to step S101 to display the multi-view screen 100.

The termination operation monitored in step S107 is an operation of the None button 223.

In a case where the None button 223 is operated, the CPU 71 proceeds from step S107 to step S111 to terminate cropping processing of a crop image to be processed, regardless of the previous operations. Then, the CPU 71 returns to step S101 to display the multi-view screen 100.

The Up/Far mode operation monitored in step S120 is an operation of the Up/Far mode button 230.

In a case where the Up/Far mode button 230 is operated, the CPU 71 proceeds from step S120 to step S130 to change zoom-in/zoom-out mode setting. Then, the CPU 71 returns to step S103 to continuously display the crop setting screen 200.

The spacing mode operation monitored in step S120 is an operation of the Spacing mode button 231.

In a case where the Spacing mode button 231 is operated, the CPU 71 proceeds from step S121 to step S131 to change spacing mode setting. Then, the CPU 71 returns to step S103 to continuously display the crop setting screen 200.

The image selection operation monitored in step S122 is an image selection operation in the image selection region 202 of the crop setting screen 200. The user can select an image to be a crop source in the image selection region 202. In a case where an image selection operation has been performed, the CPU 71 proceeds from step S122 to step S132 to change a shot VD to be a crop source. Then, the CPU 71 returns to step S103 to continuously display the crop setting screen 200. In this case, the image of the setting region 201 is changed to the shot VD selected at this time in association with the change of the crop source.

The manual designation (crop region designation) operation monitored in step S123 is a crop region designation operation as a manual mode. In particular, the manual designation operation is, for example, an operation of designating coordinates as a first position PT1 in FIG. 16.

When the start of a manual operation is detected, the CPU 71 proceeds to step S133 to perform display control processing during the manual operation.

Figure 28:
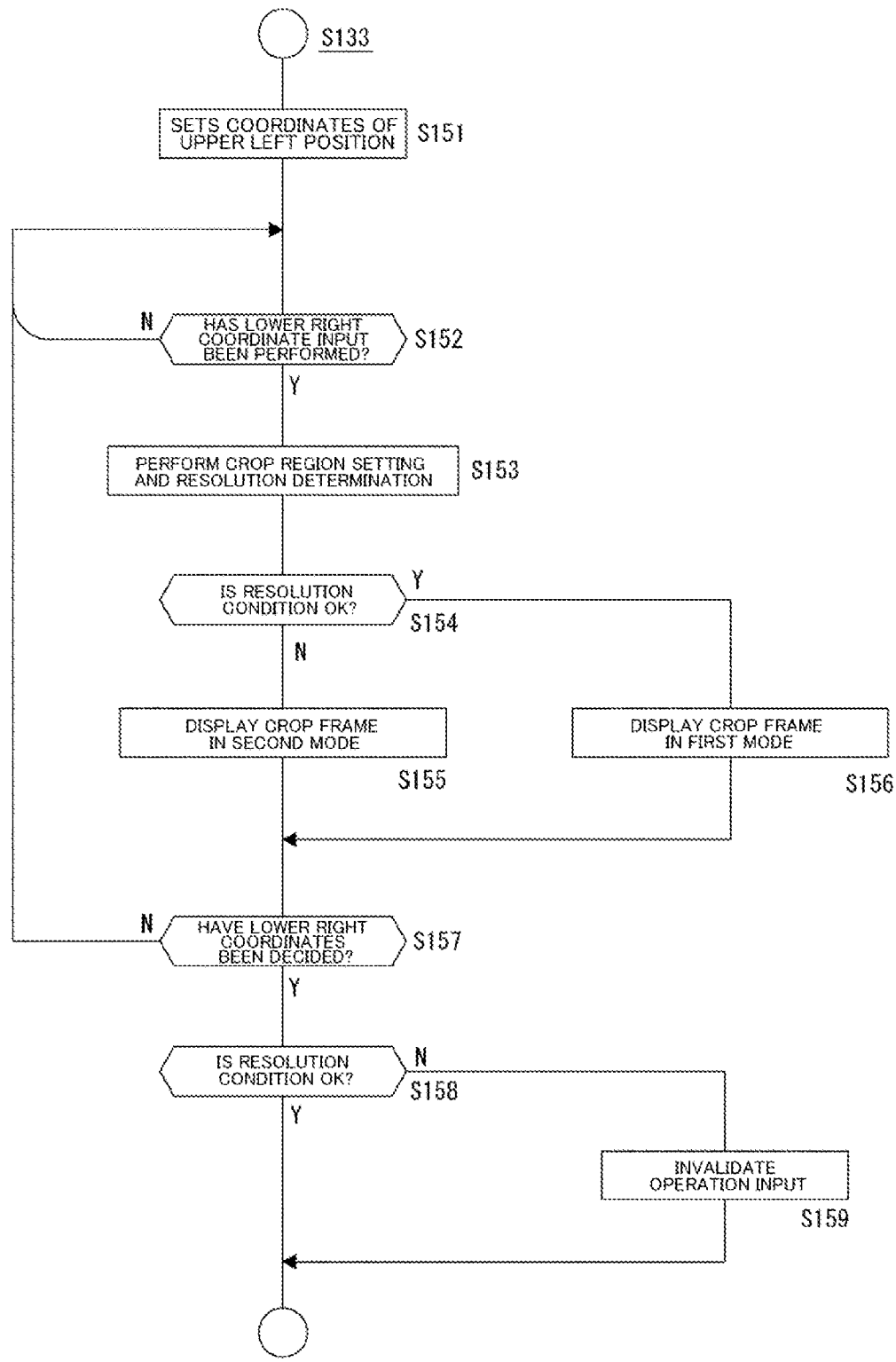
FIG. 28 is a flowchart of in-operation display processing in a manual mode in the embodiment.

The process of step S133 is illustrated in FIG. 28. Meanwhile, this is a processing example based on an operation of designating upper left coordinates and lower right coordinates as illustrated in FIG. 16.

The CPU 71 sets coordinates of an upper left position of a crop region in step S151. This is coordinates of a first designated position PT1 when a manual operation is started.

In step S152, the CPU 71 monitors a lower right coordinate input. For example, a drag operation is monitored.

The CPU 71 performs crop region setting and resolution determination in step S153 in response to an input of a lower right position by a drag operation or the like. Then, in step S154, processing is divided according to whether or not a resolution condition is OK. In a case where the resolution condition is OK, the CPU 71 displays a crop frame CRWm in a first mode in step S156. When the resolution condition is not OK, the CPU 71 displays the crop frame CRWm in a second mode in step S155.

The first mode is set to be, for example, a red crop frame CRWmR. The second mode is set to be, for example, a yellow crop frame CRWmY (see FIG. 17).

As the first mode, text, an icon, or the like indicating that setting can be performed may be displayed. As the second mode, text, an icon, or the like indicating that setting cannot be performed may be displayed.

The processes of step S152 to step S156 are repeated until lower right coordinates are decided.

The decision of the lower right coordinates is set to be, for example, the termination of a drag operation or the like. A position at which dragging is terminated is set to be lower right coordinates designated by a user.

Thus, for example, the processes of step S152 to step S156 are repeated while the user is performing a drag operation. As described above with reference to FIG. 17, in a range in which a resolution is not sufficient, a range to be designated is clearly shown as the yellow crop frame CRWmY. On the other hand, in a range in which a resolution is sufficient, a range to be designated is clearly shown as the red crop frame CRWmR.

When lower right coordinates to be input are decided, the CPU 71 determines in step S158 whether or not a region designated by the upper left coordinates and the lower right coordinates satisfies a resolution condition. When the region satisfies the resolution condition, the designation of a crop region based on an input this time is invalidated in step S159. In this case, the display of the crop frame CRWmY displayed in the second mode may be terminated.

As illustrated in FIG. 28 described above, when the process of step S133 in FIG. 27 is terminated, the CPU 71 performs crop region setting in step S134. That is, when the input is not invalidated in step S159 described above, an operation of designating a crop region (a region indicated by the crop frame CRWmR displayed in the first mode) which is designated by a manual operation is set to be a valid operation.

Then, the CPU 71 returns to step S103 to continuously display the crop setting screen 200.

Here, the crop region setting in step S134 is treating an operation input this time as a valid operation at that point in time and is not finally deciding crop region setting by a manual operation.

A crop region designated by a manual operation is reflected in setting in step S108 in response to the subsequent operation of the OK button 220.

Thus, even when a user performs a manual operation once, the user can perform setting again as many times as necessary before performing an operation of the OK button 220, can perform subject designation in a semi-automatic mode, and can perform change to an instruction for an automatic mode.

The subject designation operation monitored in step S124 of FIG. 27 is an operation of subject designation (for example, the designation of a candidate frame EW) for a semi-automatic mode.

When the subject designation operation is detected, the CPU 71 proceeds to step S136 to perform processing for displaying a crop frame and setting a crop region.

Figure 29:
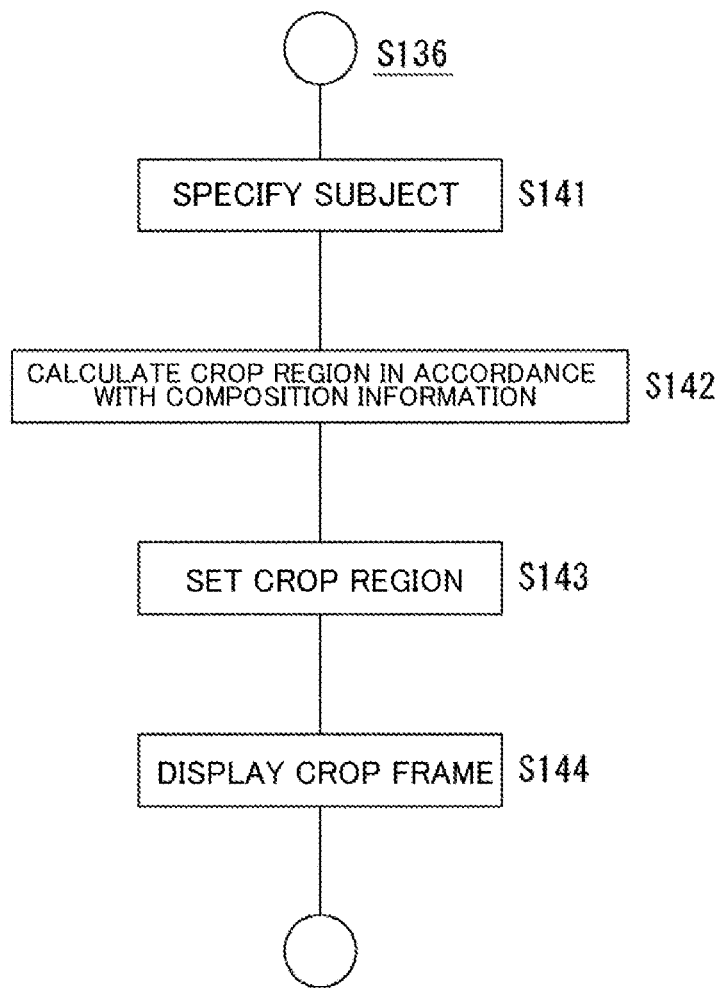
FIG. 29 is a flowchart of crop frame display/setting processing in the embodiment.

The process of step S136 is illustrated in FIG. 29.

In step S141, the CPU 71 specifies a subject designated by the subject designation operation. In step S142, the CPU 71 performs the calculation of a crop region in accordance with composition information (for example, information of composition setting) at that point in time.

The composition information mentioned here includes information of zoom-in/zoom-out set by the Up/Far mode button 230, types of an up shot, a bust shot, a waist shot, a knee shot, and a full-length shot, and the like. In addition, the composition information also include turn-on/turn-off information of spacing based on a spacing mode operation. In addition, other composition information is also included.

Thus, a crop region in which a designated subject is cut out in accordance with setting related to composition at that point in time is calculated.

The CPU 71 sets the crop region calculated in step S142 to be a crop region according to a semi-automatic mode in step S143.

Then, the CPU 71 displays a crop frame CRWs indicating the crop region on a screen in step S144.

When the process of step S136 in FIG. 27 is terminated as in the processing illustrated in FIG. 29 described above, the CPU 71 returns to step S103 of FIG. 26 to continuously display the crop setting screen 200.

Here, the crop region setting in step S144 is treating a subject designation operation in a semi-automatic mode this time as a valid operation at that point in time, and is not finally deciding crop region setting in a semi-automatic mode. Also in this case, the designation of a semi-automatic mode is reflected in setting in step S108 in accordance with the subsequent operation of the OK button 220.

Thus, even when a user performs subject designation operation in a semi-automatic mode once, the user can perform setting as many times as necessary again before performing an operation of the OK button 220, can perform a manual operation again, or can perform change to an instruction for an automatic mode.

6. Switching Processing

Subsequently, a processing example of an image processing device related to the switching of a main image will be described with reference to FIG. 30. Here, a case where one shot VD is input as illustrated in FIG. 10, and shots VD as a plurality of crop images are generated from the shot VD is assumed.

Figure 30:
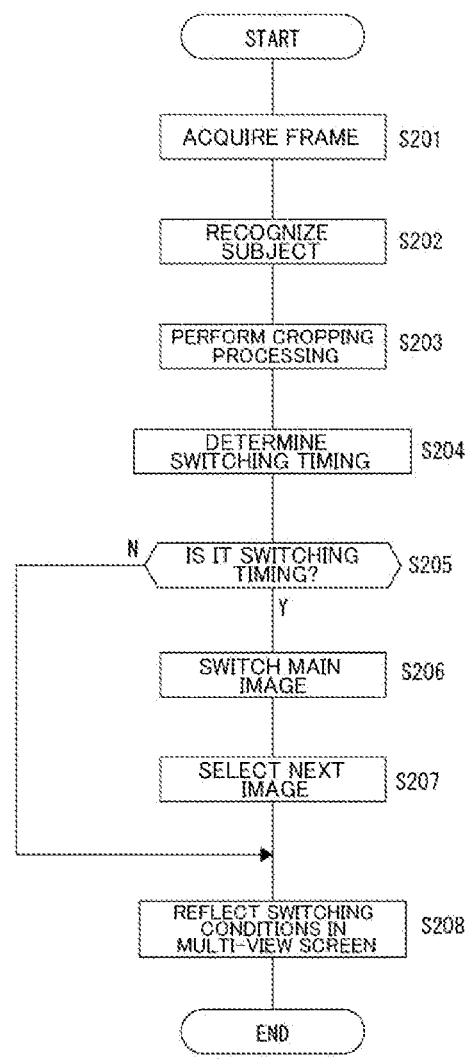
FIG. 30 is a flowchart of switching processing in the embodiment.

FIG. 30 illustrates processing performed for each one frame timing (or an intermittent frame timing) of an image supplied as a shot VD.

When the CPU 71 acquires image data of one frame of a shot VD in step S201, the CPU 71 performs subject recognition processing based on a function of the subject recognition unit 34 in step S202.

In step S202, the CPU 71 executes cropping processing based on a function of the cropping processing unit 36. In this case, cropping processing according to a crop mode which is set as described above is performed.

In step S204, the CPU 71 performs switching timing determination processing based on a function of the switching control unit 33. This is processing for determining whether or not it is a switching timing for a main image MP at present. Specifically, the switching determination is performed in accordance with a duration length of the present main image MP, contents of a shot capable of being selected at present, and the like. In addition, the switching determination may also be performed by a user operation.

Figure 31:
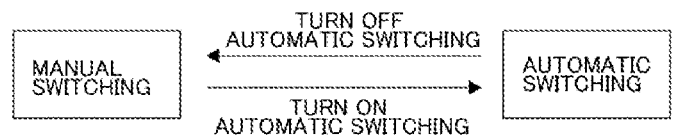
FIG. 31 is a diagram illustrating a switching mode transition in the embodiment.

In particular, a switching mode includes a manual switching mode and an automatic switching mode as illustrated in FIG. 31. These switching modes are switched in accordance with a user operation. For example, switching is performed by an operation on the multi-view screen 100 (for example, an operation of the switching mode presentation unit).

In the case of the manual switching mode, the CPU 71 monitors an operation for instructing a user's switching of a main image MP to perform determination in step S205.

In the case of the automatic switching mode, the CPU 71 determines whether or not it is a switching timing in accordance with image analysis results, image classification of each shot, a duration length of the present main image, and the like in step S205.

When it is not a switching timing at present, the CPU 71 proceeds from step S205 to step S208 and terminates processing for one frame period as a state in which with the present state is reflected in the multi-view screen 100.

In a case where it is determined in step S205 that it is a switching timing when processing is performed on a certain frame, the CPU 71 proceeds from step S205 to step S206 to perform switching control of a main image MP.

That is, the switching unit 40 is controlled such that a shot, which has been the next main image until that time, is set to be a main image in the multi-view screen 100.

Further, in step S207, the CPU 71 selects a shot VD to be a next main image (next image MPN).

Then, in step S208, the above-described switching conditions are reflected in the multi-view screen 100.

That is, a shot, which has been displayed as a next image MPN until that time, is displayed as a main image MP. In addition, the shot selected in step S207 is displayed as a next image MPN.

Switching conditions are reflected in the multi-view screen 100 by continuously performing the above-described processing for each frame. In addition, cropping processing in which a crop mode and a crop region which are set in the crop setting screen 200 are reflected is performed.

Here, various examples of a method of selecting a next image MPN in step S207 are conceivable, but for example, any one or two or more of the following selection rules may be used.

A crop image for which a manual mode or a semi-automatic mode is designated by a user is preferentially selected at a point in time immediately after the operation. For example, the shot VD is easily selected by lottery or the like after weighting is performed.

A crop image for which a manual mode or a semi-automatic mode is designated by a user is necessarily selected as a next image MPN at a point in time immediately after the operation.

A crop image for which an automatic mode is designated by a user is preferentially selected at a point in time immediately after the operation. For example, the shot VD is easily selected by lottery or the like after weighting is performed.

A crop image for which an automatic mode is designated by a user is necessarily selected as a next image MPN at a point in time immediately after the operation. In a case where a user has performed an operation in the crop setting screen 200 by using the above-described selection rule, a crop image in which the operation is reflected is easily set as a main image MP (or is set as the main image MP) at an early stage. In many cases, a shot VD for which setting has been changed is a shot that a user is paying attention to, and thus it is preferable that the shot be set as a main image MP if possible immediately after the operation.

In addition, the following selection rule is also conceivable.

When a subject person is not shown in a shot VD set in a manual mode, the shot is not selected as a next image MPN.

In the case of a manual mode, a crop region is fixed, which may result in a state where a target subject is not shown within the shot VD. In such a case, the shot VD is not suitable as a main image MP, and thus another shot is selected as a next image MPN.

Further, although it is not related to crop setting, it is also conceivable to select the next image MPN according to image classification of each shot. In this case, the following selection rules are used.

"A shot which is the same as or equivalent to a shot of a present main image" is not selected as a next image MPN.

"A shot of a subject which is the same as that of a shot of a main image in a case where a present main image is a minor role shot" is not selected as a next image MPN.

"A minor role shot in a case where a present main image is a full shot and there is another leading role shot" is not selected as a next image MPN.

"A minor role shot in a case where a present main image is a minor role shot and there is another leading role shot" is not selected as a next image MPN.

"A shot other than a speaker shot in a case where there is a speaker shot" is not selected as a next image MPN.

By using such a selection rule, it is possible to increase the probability that automatic switching appropriate for contents of an imaging scene is performed.

In addition, various selection rules and image classifications are conceivable, and a user may be able to perform turn-on/turn-off of each of a selection rule by which determination can be performed and image classification to be determined.

For example, it may be possible to turn off the detection of a speaker shot or turn off a selection rule related to the speaker shot.

In addition, for example, it may be possible to turn off the detection of a leading role shot or turn off a selection rule related to the leading role shot.

In addition, for example, it may be possible to turn off the detection of a main subject shot or turn off a selection rule related to the main subject shot.

In addition, for example, it may be possible to turn off the detection of a minor role shot or turn off a selection rule related to the minor role shot.

By allowing a user to perform these selections, it is possible to perform adjustment so that automatic switching is performed according to a moving image content production intention at that time.

Meanwhile, although the selection of the next image MPN has been performed above, it is also conceivable to ignore the previous next images MPN and immediately select and switch a shot as a main image MP. Also in this case, it is possible to make a crop image operated in the crop setting screen 200 likely to be set as the main image MP immediately after the operation (or necessarily set as the main image MP) by applying any one of the above-described selection rules.

In addition, also in the case of an automatic switching mode, it is also preferable to receive a switching instruction based on a user operation. For example, in a case where a scene desired to be suddenly shown occurs, it is preferable to allow the user to set the corresponding shot VD as a main image.

It is conceivable that a user operation can be performed on the multi-view screen 100, can be performed in response to an instruction based on a sound input, or the like.

7. Summary and Modification Example

According to the above-described embodiment, the following effects are obtained. The image processing device according to the embodiment includes the cropping processing unit 36 (cut-out processing unit) that cuts out a portion of a region of a captured image and the UI control unit 30. The UI control unit 30 performs display control processing of the multi-view screen 100 (first screen) including a captured image display region for displaying a captured image and a crop image display region for displaying a crop image cut out by the cropping processing unit 36. In addition, the UI control unit 30 performs display control processing for making display transition from the multi-view screen 100 to the crop setting screen 200 (second screen) in which a crop region obtained from a captured image is set. In addition, the UI control unit 30 performs processing for receiving a manual mode operation (first user operation) of designating at least one set of coordinates related to a crop region and a subject designation operation (second user operation) in a semi-automatic mode for designating a subject related to a crop region in the crop setting screen 200. Then, the UI control unit 30 performs processing for setting a crop region on the basis of a manual mode operation or a subject designation operation in a semi-automatic mode.

That is, in the multi-view screen 100, a captured image and a crop image are displayed, and switching conditions are presented. In the crop setting screen 200, a user interface capable of designating a crop region and a crop mode is provided. A user (operator) can collectively confirm a captured image and a crop image as input images that can be switched by the multi-view screen 100 (first screen). In addition, the user can set a crop region by the crop setting screen 200 (second screen). Thereby, it is possible to easily perform switching and crop region setting according to conditions.

In particular, regarding the crop region setting, crop region setting according to a manual operation in the same crop setting screen 200 or subject designation in a semi-automatic mode can be arbitrarily executed. That is, an operation that is convenient for a user at that time can be intuitively selected out of the manual mode operation and the semi-automatic mode operation, and thus the operability is improved.

This is more effective because it is not necessary to perform mode switching operations specifically for operations.

For example, in the crop setting screen 200, a candidate frame EW is displayed. When the inside of the candidate frame EW is designated by a click operation or the like, a crop region (a range indicated by a crop frame CRWs) is calculated in a semi-automatic mode, while the designation of the outside of the candidate frame EW is recognized as an operation of designating upper left coordinates of a crop region according to a manual operation. Alternatively, only a click operation may be recognized as subject designation in a semi-automatic mode, and a drag operation may be recognized as a manual mode operation.

Thereby, the user does not need to perform an operation for switching between a manual mode and a semi-automatic mode operation. Thus, it is possible to select a convenient setting method at each occasion and perform crop region setting with a one-touch operation.

Such operability is extremely desirable, especially when an operation has to be rapidly performed such as during live broadcasting or the like.

Meanwhile, even when a candidate frame EW is not displayed as illustrated in FIG. 24, a semi-automatic mode operation is recognized when coordinates designated by a user are positioned within a subject recognized as, for example, a person or the like, and a manual operation is recognized when the coordinates are positioned outside a subject, thereby making it possible to eliminate the need of the user's mode switching operation.

The UI control unit 30 of the image processing device according to the embodiment displays an image which is a crop source in the crop setting screen 200, and executes the display of a crop frame CRWm indicating a crop region designated by a manual mode operation in response to the manual mode operation being received on the image which is a crop source.

That is, the user can perform crop region setting by a manual operation in the crop setting screen 200. However, in this case, it is possible to designate the crop frame CRWm while visually recognizing it as illustrated in FIGS. 16 and 18 by performing an operation on the image which is a crop source. Thereby, it is possible to set an appropriate crop region while confirming a subject on the actual image which is a crop source.

Since the contents of a subject of a captured image change at all times, being able to visually recognize the crop frame CRWm on such an image at the present point in time is extremely suitable for crop region setting for generating a crop image.

In the case of the example illustrated in FIG. 16, a user can perform a crop region setting operation while flexibly considering a range by a drag operation.

In the case of the example illustrated in FIG. 18, it is only necessary to designate central coordinates, and thus it is possible to rapidly and easily perform a crop region setting operation.

In addition to this, there are various other manual operation methods. For example, an operation of enlarging or reducing the crop frame CRWm by a pinch-out or pinch-in operation on a touch panel is also conceivable.

Meanwhile, a crop region display may be display indicating a crop region and is not limited to the crop frame CRWm. The display may be display allowing visual recognition of a crop region such as highlighting the crop region or displaying the crop region in a different color.

In the embodiment, description has been given of an example in which a crop region is displayed in different display modes in a case where a crop region according to a manual mode operation does not satisfy a resolution condition of a crop image and a case where the crop region satisfies the resolution condition of the crop image (see FIG. 17).

Thereby, the user can recognize whether or not crop region setting is in an appropriate range at the time of performing the crop region setting by a manual operation in the crop setting screen 200.

For example, through the processing illustrated in FIG. 28, a yellow display (crop frame CRWy) is displayed at a point in time when a crop frame CRW in a range in which a resolution is insufficient, and a red display (crop frame CRWr) is performed when a crop frame CRW in a range in which a resolution is sufficient, and the like in the process of the drag operation described in FIG. 17. An operation can be performed while viewing the display, and thus a crop region of which the image quality is not reduced even with a manual operation can be set.

The displays in different display modes in a crop region display when a crop region does not satisfy a resolution condition and a crop region display when the crop region satisfies the resolution condition are displays corresponding to at least one of a display mode having a different color or brightness of a crop region display, a display mode having a different type of crop region display, and a display mode having a different additional image.

The color or brightness of the crop region display is the color or brightness of a frame line or a region as a crop region display.

The type of crop region display is, for example, the type of bold line or thin line for a frame line as a crop region image, or the type of solid line, dashed line, dotted line, alternating dotted-dashed line, alternating two dots-dashed line, or the like. In addition, there are image types such as shadow, hatching, monochrome/color, and pointillism for a region as a crop region display.

The additional image is text, an icon, a sign, or the like, and the display mode having a different additional image is the display of text contents, an icon, or the like indicating whether or not a resolution condition is satisfied, display only in a case where the resolution condition is satisfied, display in a case where the resolution condition is not satisfied, or the like.

The user can recognize whether or not a crop region (crop frame CRWm) set by a manual operation is in an appropriate range, for example, by these displays and can use the recognition as a guide for an operation.

In the embodiment, the UI control unit 30 displays an image which is a crop source in the crop setting screen 200, and sets a crop region including a subject designated by a user operation in response to a subject designation operation in a semi-automatic mode being received on the image which is a crop source.

The user can perform crop region setting in a semi-automatic mode by the crop setting screen 200. In this case, a subject is designated on an image which is a crop source. Thereby, a crop region (a range of a crop frame CRWs) including the subject is automatically calculated.

That is, the user does not need to perform an operation of specifically designating a crop region. Thus, in a case where the user desires a crop image of a specific subject, crop region setting can be performed by an extremely easy operation.

The UI control unit 30 according to the embodiment executes a crop region display (for example, a crop frame CRWs) indicating a crop region including a subject designated by a user operation in response to a subject designation operation in a semi-automatic mode being received.

Thereby, the user can confirm a set crop region by the crop frame CRWs at the time of giving an instruction for crop region setting based on a semi-automatic mode in the crop setting screen 200 (see FIG. 19). Thus, it is only required that the setting of the crop region is validated in the case of an appropriate crop frame CRWs, and a setting operation is performed again when the crop frame is considered not to be appropriate.

Also in this case, the crop region display indicates display indicating a crop region and is display allowing visual recognition of the crop region such as displaying a frame indicating the crop region, highlighting the crop region, or displaying the crop region in a different color.

Description has been given of an example in which the UI control unit 30 according to the embodiment calculates a crop region in accordance with the state of selection of composition information at the time of setting a crop region including a subject designated by a subject designation operation in a semi-automatic mode.

That is, the crop frame CRWs is calculated according to a zoom-in/zoom-out mode, a spacing mode, and the like in step S142 of FIG. 29. Thus, the user easily sets a desired crop region even in a semi-automatic mode by selecting composition information. That is, it is possible to perform crop region setting which is satisfactory for a user even in a semi-automatic mode by appropriately operating composition information.

Although a spacing mode and a zoom-in/zoom-out mode are adopted as an example of composition information, it may be possible to operate various other pieces of composition information.

For example, it is conceivable to be able to select types such as an up shot, a bust shot, a waist shot, a knee shot, and a full-length shot, select a sun-flag composition, the rule of thirds, or the like, and set a zooming state more finely. In step S142, it is only required that crop region calculation having these pieces of composition information reflected therein is performed.

The UI control unit 30 according to the embodiment displays information regarding a composition for a subject in the crop setting screen 200.

For example, as illustrated in FIG. 15 and the like, the face direction information 242 is displayed with respect to each subject person in the crop setting screen 200. This is information indicating left, right, and front (spacing is not performed) as a direction in which spacing is performed. Thereby, the user can predict a composition in a case where a crop region is set in a semi-automatic mode. This is useful for determination regarding whether to use a semi-automatic mode or not. As information regarding a composition, information of a zoom-in/zoom-out mode, information of the turn-on/turn-off of a spacing mode, information of the type of composition, and the like may be displayed as composition information with respect to each subject. In addition, information of the degree of zoom-in/zoom-out, information of the amount of spacing, and the like may be displayed. Information such as an up shot, a bust shot, a waist shot, a knee shot, and a full-length may be displayed. That is, any information by which the user can predict what kind of composition is set in a case where a crop region is set in a semi-automatic mode may be used, and various information is conceivable as "information regarding a composition" to be displayed.

The UI control unit 30 according to the embodiment displays a candidate frame EW indicating being a crop candidate for each subject which is a candidate for a crop image in the crop setting screen 200, and receives an operation of designating the candidate frame EW as a subject designation operation in a semi-automatic mode. The user can perform crop region setting in a semi-automatic mode by the crop setting screen 200, but in this case, the candidate frame EW is displayed for a subject on an image which is a crop source. The user can recognize a subject for which a crop region can be set in a semi-automatic mode, by the candidate frame EW. That is, the user can perform an operation in a semi-automatic mode by performing an operation of designating the candidate frame EW, which is an easy-to-understand operation.

In other words, a subject for which the candidate frame EW is not displayed is a target recognized by subject recognition, for example, a subject which is not a person or the like. That is, the subject is also a subject that is not a target for crop region setting based on a semi-automatic mode. For this reason, the candidate frame EW also functions as display so that the user does not uselessly designate a subject for which the candidate frame is not displayed.

In the embodiment, description has been given of an example in which the UI control unit 30 divisively displays the candidate frame EW for each composition and also receives the designation of a composition by a designation operation for the division of the candidate frame EW.

For example, the candidate frames EW are divisively displayed according to an up shot, a bust shot, a waist shot, a knee shot, and a full-length shot (the candidate frames EW1, EW2, EW3, EW4, and EW5), and composition designation is also performed according to a designated position (see FIGS. 21, 22A, and 22B).

Thereby, subject designation and composition designation can be executed by one designation operation. Thus, even when a user desires to select a composition together with a subject, the user can perform the selection by one designation operation, which is an extremely convenient operation.

The UI control unit 30 according to the embodiment displays a captured image which is not a target for crop region setting but may be a crop source, together with an image which is a crop source being a target for crop region setting in the crop setting screen 200.

For example, as described above with reference to FIG. 15 and the like, the shots VD1, VD2, and VD3 which are captured images are displayed in the image selection region 202. The captured images VD2 and VD3 are not set as targets for crop region setting (crop sources) at present, but are captured images that may be crop sources.

A user can display these captured images and can also confirm other captured images. In addition, it is possible to perform a desired crop region setting more rapidly by making it possible to arbitrarily change a captured image being a crop source.

The UI control unit 30 according to the embodiment performs display allowing an automatic mode of a crop region to be selected in the crop setting screen 200 and the reception of an automatic mode operation.

For example, as described above with reference to FIG. 15 and the like, crop region setting is set to be in an automatic mode by operating the Automatic button 222 (see FIG. 25). Thereby, the user can easily use the designation of an automatic mode according to conditions, in addition to a manual operation and an operation in a semi-automatic mode.

In an automatic mode, the cropping processing unit 36 analyzes other shots VD (a crop image and a captured image) and changes crop regions in a timely manner so that they do not overlap each other, whereby a valid crop image is generated.

Description has been given of an example in which the image processing device according to the embodiment includes the switching control unit 33 that switches a main image MP to a shot VD selected from among a plurality of shots VD including a captured image and a crop image, and the UI control unit 30 causes the main image MP and a next image MPN being a next main image to be displayed in different display modes in the multi-view screen 100.

For example, as described above with reference to FIGS. 13 and 14, in the multi-view screen 100, the main image presentation unit 101 and the next presentation unit 102 are configured to have different display modes. For example, the colors and types of frames thereof are made different from each other.

Thereby, a user can easily recognize the main image and the next main image. Meanwhile, regarding the different display modes, the main image presentation unit 101 and the next presentation unit 102 may be configured to have different colors of regions, background colors, brightnesses, image types (monochrome/color or the like), sizes of regions, and the like. That is, it is only required that distinguishable display modes are used.

The UI control unit 30 according to the embodiment executes display indicating whether crop region setting is performed by a manual mode operation or crop region setting is performed by a subject designation operation in a semi-automatic mode with respect to a crop image to be displayed in the multi-view screen 100.

For example, as described above with reference to FIG. 12, the crop mode presentation unit 106 presents whether crop region setting has been performed in a semi-automatic mode or has been performed in a manual mode for a shot VD as each crop image. The user can confirm this, can determine whether or not a crop region setting mode is appropriate according to conditions, and can change a mode as necessary.

The UI control unit 30 according to the embodiment executes display indicating that an automatic mode has been selected and crop region setting has been performed for a crop image displayed in the multi-view screen 100.

For example, as described above with reference to FIG. 12, the crop mode presentation unit 106 presents that it is an automatic mode for a shot VD for which crop region setting is performed in an automatic mode. A user can confirm this, can determine whether or not an automatic mode is appropriate according to conditions, and can change a mode as necessary.

Meanwhile, a display mode of a frame or a region of each crop image may be different according to a manual mode, a semi-automatic mode, and an automatic mode. For example, the color, brightness, frame type, and the like thereof may be different.

Description has been given of an example in which the switching control unit 33 according to the embodiment automatically performs the switching of a main image in accordance with the determination of a switching timing by the setting of an automatic switching mode.

The switching of a main image MP is also executed, for example, not only by manual processing but also by automatic switching processing.

For example, a switching timing is determined in processing illustrated in FIG. 30. For example, a switching timing is determined in accordance with the recognition of a main subject, an elapsed time of a present main image, and the like. In addition, the switching of a main image is performed accordingly, and thus it is possible to create content for broadcasting, distribution, recording, and the like which has natural contents, a high quality, and an interest without causing an operation burden on a user (operator).

In the embodiment, processing for selecting a next image MPN to be a next main image is performed in accordance with a main image MP being switched by the switching control unit 33, and the UI control unit 30 executes the display of an image set to be a main image MP by switching and an image set to be a next main image by the selection processing in the multi-view screen 100.

For example, as described above with reference to FIG. 31, a main image is switched in switching processing, and the selection of a next image MPN being a next main image is performed (S206, S207).

Accordingly, display is updated also in the multi-view screen 100 (S208). Thereby, a user can recognize the switching of a main image and confirm an image which is scheduled to be switched at the next timing.

In the embodiment, description has been given of a case where a crop image for which crop region setting has been performed in the crop setting screen 200 is subjected to selection processing in which the degree of priority is increased more than those of other images in processing for selecting a next image MPN (or a main image MP).

For example, an image in which an operation related to a crop region has been performed in the crop setting screen 200 is easily selected as a main screen next. As described above with reference to FIG. 30, a main image is switched, and the selection of a next image MPN is performed (S206, S207). However, in this case, the selection is weighted rather than being performed randomly. That is, selection processing is performed by performing weighting so that an image is set to be a next main image, the image being an image on which an operation related to a crop region (a change in mode, crop region setting, or the like) has been performed in the crop setting screen 200 just before. Alternatively, such an image is necessarily selected.

There is a strong possibility that an image operated by a user in the crop setting screen 200 is a shot considered to be important by the user at present. Consequently, it should be reflected as a main image as soon as possible. Thereby, a more preferable switching is performed as broadcasting or the like.

Various other modification examples of the processing according to the embodiment are conceivable.

The image processing device of the present disclosure may include a UI control unit that displays the multi-view screen 100 and the crop setting screen 200 to show cropping and switching conditions or performs crop region setting in accordance with a user operation, as equipment separate from equipment that performs cropping processing.

Regarding the switching of a main image MP, a case where a plurality of shots VD are used as main images MP by screen division may be added. In this case, it is also conceivable to select the plurality of shots VD (shots to be set as next images MPN), which are selected as the main images MP, in accordance with the selection rule in the embodiment.

A program according to the embodiment is a program causing, for example, a CPU, a DSP, or a device including them to execute the crop setting processing illustrated in FIGS. 26, 27, 28, and 29 the switching processing illustrated in FIG. 30, or the modification examples thereof.

That is, the program according to the embodiment is a program causing an information processing device to execute cropping processing (image cropping processing) for cutting out a portion of a region of a captured image, display control processing of the multi-view screen 100 (first screen) including a captured image display region for displaying a captured image and a crop image display region for displaying a crop image cut out by the cropping processing, display control processing for making display transition from the multi-view screen 100 to the crop setting screen 200 (second screen) in which a crop region from the captured image is set, processing for receiving a first user operation of designating at least one set of coordinates related to the crop region and a second user operation of designating a subject related to the crop region in the crop setting screen 200, and processing for setting a crop region on the basis of the first user operation or the second user operation.

With such a program, the above-described image processing device can be realized in equipment such as the portable terminal 2, the switcher 3, the cloud switcher 4, the computer device 5, or the imaging device 1.

Such a program can be recorded in advance in an HDD as a recording medium built in equipment such as a computer device, a ROM in a microcomputer including a CPU, or the like.

Alternatively, the program can be temporarily or permanently stored (recorded) in a removable recording medium such as a flexible disc, a compact disc read only memory (CD-ROM), a magnet optical (MO) disc, a digital versatile disc (DVD), a Blu-ray disc (registered trademark), a magnetic disk, a semiconductor memory, or a memory card. Such a removable recording medium can be provided as so-called package software.

Further, such a program can be installed in a personal computer or the like from the removable recording medium, and can also be downloaded from a download site via a network such as a local area network (LAN) or the Internet.

Further, such a program is suitable for a wide range of provision of the image processing device of the embodiment. For example, a program is downloaded to a personal computer, a portable information processing device, a mobile phone, a game machine, a video device, a personal digital assistant (PDA), or the like, making it possible for the personal computer or the like to function as the image processing device of the present disclosure.

Meanwhile, the advantages effects described in the present specification are merely exemplary and not limited to thereto, and other advantages effects may be obtained.

Meanwhile, the present technology can also adopt the following configurations.

(1)

An image processing device including;
  a cut-out processing unit configured to cut out a portion of a region of a captured image; and
  a user interface control unit configured to perform display control processing of a first screen including a captured image display region for displaying the captured image and a cut-out image display region for displaying a cut-out image cut out by the cut-out processing unit, display control processing for making display transition from the first screen to a second screen in which a cut-out region obtained from the captured image is set, processing for receiving a first user operation of designating, in the second screen, at least one set of coordinates and a second user operation of designating a subject, and processing for setting a cut-out region on the basis of the first user operation or the second user operation.

(2)

The image processing device according to (1), wherein the user interface control unit performs
  control for displaying an image being a cut-out source in the second screen and control for displaying a cut-out region designated by the first user operation in accordance with the first user operation on the image being the cut-out source.

(3)

The image processing device according to (2), wherein the user interface control unit performs control for displaying the cut-out region in different modes in a case where the cut-out region based on the first user operation does not satisfy a resolution condition of the cut-out image and a case where the first user operation satisfies the resolution condition of the cut-out image.

(4)

The image processing device according to (3), wherein the displays in different display modes of the display of the cut-out region when the cut-out region does not satisfy the resolution condition and the display of the cut-out region when the cut-out region satisfies the resolution condition are displays corresponding to at least one of a display mode in which the color or brightness of the display of the cut-out region is different, a display mode in which the type of display of the cut-out region is different, and a display mode in which an additional image is different.

(5)

The image processing device according to any one of (1) to (4), wherein the user interface control unit
performs control for displaying the image being the cut-out source in the second screen and
sets a cut-out region including a subject designated by the second user operation in accordance with the second user operation on the image being the cut-out source.

(6)

The image processing device according to (5), wherein the user interface control unit performs control for displaying a cut-out region indicating the cut-out region including the subject designated by the second user operation in accordance with the second user operation.

(7)

The image processing device according to (5) or (6), wherein the user interface control unit
calculates a cut-out region in accordance with a selection state of composition information when the cut-out region including the subject designated by the second user operation is set.

(8)

The image processing device according to (7), wherein the user interface control unit performs control for displaying information regarding a composition with respect to the subject in the second screen.

(9)

The image processing device according to any one of (5) to (8), wherein the user interface control unit
performs control for displaying a candidate frame indicating being a cut-out candidate for each subject which is a candidate for a cut-out image in the second screen, and
receives an operation of designating the candidate frame as the second user operation.

(10)

The image processing device according to (9), wherein the user interface control unit performs control for divisively displaying the candidate frame for each composition and
receives the designation of a composition by a designation operation for the division of the candidate frame.

(11)

The image processing device according to any one of (1) to (10), wherein the user interface control unit
performs control for displaying, in the second screen, a captured image which is not a target for cut-out region setting but may be a cut-out source, together with an image which is a cut-out source being a target for cut-out region setting.

(12)

The image processing device according to any one of (1) to (11), wherein the user interface control unit
controls display allowing an automatic setting mode of a cut-out region to be selected in the second screen and receives an automatic setting mode operation.

(13)

The image processing device according to any one of (1) to (13), further including:
a switching control unit configured to switch a main image to an image selected from among a plurality of images including the captured image and the cut-out image,
wherein the user interface control unit performs control for displaying, in the first screen, a main image and an image to be a next main image in different display modes.

(14)

The image processing device according to any one of (1) to (13), wherein the user interface control unit
Controls, on a cut-out image to be displayed in the first screen, display indicating whether cut-out region setting has been performed by the first user operation or cut-out region setting has been performed by the second user operation.

(15)

The image processing device according to (12), wherein the user interface control unit
controls, on a cut-out image to be displayed in the first screen, display indicating that an automatic setting mode has been selected and cut-out region setting has been performed.

(16)

The image processing device according to (13), wherein the switching control unit automatically performs switching of a main image in accordance with switching timing determination by an automatic switching mode being set.

(17)

The image processing device according to (13) or (16), wherein selection processing for an image to be a next main image is performed in accordance with the switching of the main image being performed by the switching control unit, and
the user interface control unit controls, in the first screen,
the display of the image being the main image by the switching
the image to be the next main image by the selection processing.

(18)

The image processing device according to (17), wherein in the selection processing, selection processing for making the degree of priority of selection of a cut-out image having been subjected to cut-out region setting in the second screen higher than those of other images is performed.

(19)

An image processing method performed by an image processing device, the image processing method including:
cut-out processing for cutting out a portion of a region of a captured image;
display control processing of a first screen including a captured image display region for displaying the captured image and a cut-out image display region for displaying a cut-out image cut out in the cut-out processing;

display control processing for making display transition from the first screen to a second screen in which a cut-out region obtained from the captured image is set;

processing for receiving a first user operation of designating, in the second screen, at least one set of coordinates and a second user operation of designating a subject; and processing for setting a cut-out region on the basis of the first user operation or the second user operation.

(20)

A program causing an information processing device to execute:

cut-out processing for cutting out a portion of a region of a captured image;

display control processing of a first screen including a captured image display region for displaying the captured image and a cut-out image display region for displaying a cut-out image cut out in the cut-out processing;

display control processing for making display transition from the first screen to a second screen in which a cut-out region obtained from the captured image is set;

processing for receiving a first user operation of designating, in the second screen, at least one set of coordinates and a second user operation of designating a subject; and processing for setting a cut-out region on the basis of the first user operation or the second user operation.

REFERENCE SIGNS LIST

1 Imaging device
2 Portable terminal
3 Switcher
4 Cloud switcher
5 Computer device
6 Network
11 Lens system
12 Imaging element unit
13 Camera signal processing unit
14 Recording control unit
15 Display unit
16 Output unit
17 Operation unit
18 Camera control unit
19 Memory unit
22 Driver unit
30 UI control unit
31 Main image selection unit
33 Switching control unit
34 Subject recognition unit
36 Cropping processing unit
40 Switching unit
70 Information processing device
71 CPU
72 ROM
73 RAM
74 Bus
75 Input and output interface
76 Input unit
77 Display unit
78 Sound output unit
79 Storage unit
80 Communication unit
81 Removable recording medium
82 Drive
100 Multi-view screen
101 Main image presentation unit
102 Next presentation unit
103 Image type presentation unit
104 Crop presentation unit
105 Switching mode presentation unit
106 Crop mode presentation unit
US Upper side
LS Lower side
200 Crop setting screen
201 Setting region
202 Image selection region
203 Operation region
220 OK button
221 Cancel button
222 Automatic button
223 None button
230 Up/Far mode button
231 Spacing mode button
240 Face recognition frame
241 Subject identification information
242 Face direction information
251 Zoom bar
252 Spacing bar
EW Candidate frame
CRW Crop frame

The invention claimed is:

1. An image processing device, comprising:
a cut-out processing unit configured to cut out a cut-out image from a cut-out region of a first captured image; and
a user interface control unit configured to:
execute display control of a first screen, wherein the first screen includes:
a captured image display region that displays the first captured image; and
a cut-out image display region that displays the cut-out image cut out by the cut-out processing unit;
execute display control for display transition from the first screen to a second screen, wherein the second screen is a screen in which the cut-out region for the cut-out image is set;
control to display, in the second screen, an image that is a cut-out source to set the cut-out region;
execute processing to receive a first user operation and a second user operation, wherein
the first user operation is associated with designation of at least one set of coordinates in the second screen, and
the second user operation is associated with designation of a subject; and
execute processing to set the cut-out region based on the first user operation or the second user operation, wherein
in response to the first user operation, the user interface control unit is further configured to execute control to display, on the image that is the cut-out source, the cut-out region designated by the first user operation in a plurality of display modes in a case where the cut-out region based on the first user operation does not satisfy a resolution condition of the cut-out image and in a case where the cut-out region based on the first user operation satisfies the resolution condition of the cut-out image, and the plurality of display modes includes at least one of a first display mode in which at least one of a color or a brightness of the display of the cut-out region is different, a second display mode in which a type of display of the cut-out region is different, or a third display mode in which an additional image is different.

2. The image processing device according to claim 1, wherein the user interface control unit is further configured to set the cut-out region, on the image that is the cut-out source, based on the subject designated by the second user operation.

3. The image processing device according to claim 2, wherein the user interface control unit is further configured to execute control to display the cut-out region that includes the subject designated by the second user operation.

4. The image processing device according to claim 2, wherein the user interface control unit is further configured to calculate the cut-out region based on a selection state of composition information when the cut-out region including the subject designated by the second user operation is set.

5. The image processing device according to claim 4, wherein the user interface control unit is further configured to execute control to display the composition information with respect to the subject in the second screen.

6. The image processing device according to claim 2, wherein the user interface control unit is further configured to:
execute control to display a candidate frame indicating a cut-out candidate for each subject that is a candidate for the cut-out image in the second screen; and
receive an operation of designation of the candidate frame as the second user operation.

7. The image processing device according to claim 6, wherein the user interface control unit is further configured to:
execute control to divisively display the candidate frame for each composition; and
receive a composition designation by the operation of designation for the division of the candidate frame.

8. The image processing device according to claim 1, wherein
the user interface control unit is further configured to execute control to display, in the second screen, a second captured image together with the first captured image,
the second captured image is not a current target image to set the cut-out region, and
the first captured image is the cut-out source and the current target image to set the cut-out region.

9. The image processing device according to claim 1, wherein the user interface control unit is further configured to:
control display to allow an automatic setting mode of the cut-out region to be selectable in the second screen; and
receive an automatic setting mode operation.

10. The image processing device according to claim 9, wherein
the user interface control unit is further configured to control display to indicate, on the cut-out image displayed in the first screen, that the automatic setting mode is selected and that the cut-out region is set based on the selection.

11. The image processing device according to claim 1, further comprising:
a switching control unit configured to switch a main image to an image selected from among a plurality of images, wherein
the plurality of images includes the first captured image and the cut-out image, and
the user interface control unit is further configured to execute control to display, in the first screen, each of the main image and a next main image in different display modes.

12. The image processing device according to claim 11, wherein
the switching control unit is further configured to automatically switch the main image based on a switching timing, and
determination of the switching timing is based on an automatic switching mode that is set.

13. The image processing device according to claim 11, wherein
selection processing for the next main image is based on the switching of the main image by the switching control unit, and
the user interface control unit is further configured to control, based on the selection processing, in the first screen, the display of the next main image as the main image.

14. The image processing device according to claim 13, wherein
in the selection processing, a degree of priority of selection of the cut-out image as the next main image or the main image is higher among the plurality of images.

15. The image processing device according to claim 1, wherein the user interface control unit is further configured to control display to indicate, on the cut-out image displayed in the first screen, whether the cut-out region is set in response to the first user operation or the second user operation.

16. An image processing method, comprising:
in an image processing device:
cut-out processing for cutting out a cut-out image from a cut-out region of a captured image;
display control processing of a first screen, wherein the first screen includes:
a captured image display region for displaying the captured image; and
a cut-out image display region for displaying the cut-out image cut out in the cut-out processing;
display control processing for display transition from the first screen to a second screen, wherein the second screen is a screen in which the cut-out region for the cut-out image is set;
controlling to display, in the second screen, an image that is a cut-out source to set the cut-out region;
processing for receiving a first user operation and a second user operation, wherein
the first user operation is associated with designation of at least one set of coordinates in the second screen, and
the second user operation is associated with designation of a subject;
processing for setting the cut-out region based on the first user operation or the second user operation; and
executing, in response to the first user operation, control to display, on the image that is the cut-out source, the cut-out region designated by the first user operation in a plurality of display modes in a case where the cut-out region based on the first user operation does not satisfy a resolution condition of the cut-out image and in a case where the cut-out region based on the first user operation satisfies the resolution condition of the cut-out image, wherein
the plurality of display modes includes at least one of a first display mode in which at least one of a color or a brightness of the display of the cut-out region is different, a second display mode in which a type of display of the cut-out region is different, or a third display mode in which an additional image is different.

17. A non-transitory computer-readable medium having stored thereon, computer-executable instructions which, when executed by a computer, cause the computer to execute operations, the operations comprising:
cut-out processing for cutting out a cut-out image from a cut-out region of a captured image;
display control processing of a first screen, wherein the first screen includes:
a captured image display region for displaying the captured image; and
a cut-out image display region for displaying the cut-out image cut out in the cut-out processing;
display control processing for display transition from the first screen to a second screen, wherein the second screen is a screen in which the cut-out region for the cut-out image is set;
controlling to display, in the second screen, an image that is a cut-out source to set the cut-out region;
processing to receive a first user operation and a second user operation, wherein
the first user operation is associated with designation of at least one set of coordinates in the second screen, and
the second user operation is associated with designation of a subject;
processing for setting the cut-out region based on the first user operation or the second user operation; and
executing, in response to the first user operation, control to display, on the image that is the cut-out source, the cut-out region designated by the first user operation in a plurality of display modes in a case where the cut-out region based on the first user operation does not satisfy a resolution condition of the cut-out image and in a case where the cut-out region based on the first user operation satisfies the resolution condition of the cut-out image, wherein
the plurality of display modes includes at least one of a first display mode in which at least one of a color or a brightness of the display of the cut-out region is different, a second display mode in which a type of display of the cut-out region is different, or a third display mode in which an additional image is different.

* * * * *